US008983739B2

(12) United States Patent
Faivre

(10) Patent No.: US 8,983,739 B2
(45) Date of Patent: Mar. 17, 2015

(54) REAL TIME PULL-SLIP CURVE MODELING IN LARGE TRACK-TYPE TRACTORS

(71) Applicant: Caterpillar Inc., Peoria, IL (US)

(72) Inventor: Joseph Faivre, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/691,010

(22) Filed: Nov. 30, 2012

(65) Prior Publication Data

US 2014/0156153 A1 Jun. 5, 2014

(51) Int. Cl.
*G06F 7/70* (2006.01)
*G07C 5/08* (2006.01)

(52) U.S. Cl.
CPC ............ *G07C 5/0841* (2013.01); *G07C 5/0808* (2013.01)
USPC ................. 701/50; 701/84; 701/82; 305/136; 305/114; 180/197; 180/9.21

(58) Field of Classification Search
USPC ........ 701/50, 82, 84, 151; 305/111, 136, 170, 305/114; 180/9.21, 197, 361; 172/1, 2
See application file for complete search history.

(56) References Cited

U.S. PATENT DOCUMENTS 3,826,388 A 7/1974 Oldenburg et al.
4,630,685 A 12/1986 Huck et al.
5,219,411 A 6/1993 Yamamoto et al.
5,265,705 A 11/1993 Takasugi et al.
5,279,378 A * 1/1994 Grawey et al. ............... 180/9.21
5,287,280 A * 2/1994 Yamamoto et al. ............. 701/84
5,467,829 A 11/1995 Barton et al.
5,560,431 A 10/1996 Stratton et al.
5,764,014 A 6/1998 Jakeway et al.
5,924,493 A 7/1999 Hartman et al.
6,076,030 A 6/2000 Rowe
6,085,583 A 7/2000 Cannon et al.
6,091,997 A 7/2000 Flamme et al.
6,203,127 B1 3/2001 Chapman
6,317,676 B1 11/2001 Gengler et al.
6,845,311 B1 1/2005 Stratton et al.
6,882,289 B2 4/2005 Motsenbocker (Continued)

FOREIGN PATENT DOCUMENTS

DE 4228102 C1 11/1993
DE 10014818 A1 10/2001

(Continued)

OTHER PUBLICATIONS

Final Office Action dated Jun. 6, 2014 U.S. Appl. No. 13/690,757, filed Nov. 30, 2012.

(Continued)

*Primary Examiner* — John Q Nguyen
*Assistant Examiner* — Aaron Smith
(74) *Attorney, Agent, or Firm* — Miller, Matthias & Hull LLP

(57) ABSTRACT

A method of estimating soil conditions of a work surface during operation of a track-type tractor measures current operating conditions and current operating state to develop adjustments to a nominal pull-slip curve. The adjusted pull-slip curve is used to calculate optimum performance in terms of an input variable such as track speed. Two factors are developed to reflect soil conditions, coefficient of traction and a shear modulus adjustment that affect different portions of the nominal pull slip curve.

20 Claims, 18 Drawing Sheets

(56) References Cited

U.S. PATENT DOCUMENTS

| | | | | |
|---|---|---|---|---|
| 7,024,306 | B2 | 4/2006 | Minami et al. | |
| 7,072,762 | B2 | 7/2006 | Minami et al. | |
| 7,206,689 | B1 | 4/2007 | Johnson | |
| 7,337,054 | B2 * | 2/2008 | Pandey et al. | 701/82 |
| 7,557,726 | B2 | 7/2009 | Nishimura et al. | |
| 2003/0121674 | A1 | 7/2003 | Scarlett et al. | |
| 2006/0025917 | A1 | 2/2006 | Pandey et al. | |
| 2006/0042804 | A1 | 3/2006 | Pecchio | |
| 2006/0287792 | A1 | 12/2006 | Jarrett | |
| 2007/0219693 | A1 | 9/2007 | Stratton et al. | |
| 2008/0269981 | A1 | 10/2008 | Pagnotta et al. | |
| 2009/0043460 | A1 | 2/2009 | Morey et al. | |
| 2009/0216410 | A1 | 8/2009 | Allen et al. | |
| 2012/0084030 | A1 | 4/2012 | Kitagawa et al. | |
| 2012/0226422 | A1 | 9/2012 | Jacobson et al. | |
| 2012/0319708 | A1 | 12/2012 | Orrico | |

FOREIGN PATENT DOCUMENTS

| | | | |
|---|---|---|---|
| DE | 102007012305 | A1 | 9/2008 |
| DE | 102008028449 | A1 | 12/2009 |
| EP | 0810121 | A1 | 12/1997 |
| JP | 10333738 | | 12/1998 |
| JP | 11024612 | | 1/1999 |
| JP | 2012030675 | | 2/2012 |

OTHER PUBLICATIONS

Non-final Office Action dated on Mar. 17, 2014 U.S. Appl. No. 13/690,934.

Non-final Office Action dated on Apr. 24, 2014 U.S. Appl. No. 13/690,894.

Non-final Office Action dated on Mar. 28, 2014 U.S. Appl. No. 13/690,780.

* cited by examiner

154

COT calculation

Shear Modulus calculation $$CyclePower = \frac{(f_{DBPcurve}^{-1}(v_{trk}) - RollRes - mg\sin\theta_{Pitch})v_{trk}(1 - f_{SlpPull}^{-1}\left(\frac{f_{DBPcurve}^{-1}(v_{trk}) - RollRes}{COT\cdot mg\cos\theta_{Pitch}}\right)k_{adj}/100)}{1 + \frac{v_{trk}(1 - f_{SlpPull}^{-1}\left(\frac{f_{DBPcurve}^{-1}(v_{trk}) - RollRes}{COT\cdot mg\cos\theta_{Pitch}}\right)k_{adj}/100)}{v_{rev}}\frac{d_{cycle}}{d_{carry}} + (T_{Load} + T_{spread})\frac{v_{trk}(1 - f_{SlpPull}^{-1}\left(\frac{f_{DBPcurve}^{-1}(v_{trk}) - RollRes}{COT\cdot mg\cos\theta_{Pitch}}\right)k_{adj}/100)}{d_{carry}}}$$

Fig. 22

REAL TIME PULL-SLIP CURVE MODELING IN LARGE TRACK-TYPE TRACTORS

TECHNICAL FIELD

The present disclosure generally relates to large track-type tractors and more specifically to measuring and displaying performance of track-type tractors during operation.

BACKGROUND

Owning and operating a large piece of earthmoving equipment can be expensive. Operating cost is a function of efficient use and the impact of carrying too small or too large a load, operating in the wrong gear, etc., can dramatically increase that cost. However, the factors that impact efficient use are often hard to measure because soil conditions, operator selections such as gear and engine speed, and ground slope at the worksite all effect efficiency. Further, operators are often provided with an overload of information intended to improve efficiency but which may often simply overwhelm the operator and cause them to ignore potentially useful information.

SUMMARY OF THE DISCLOSURE

In a first aspect of the disclosure, a track-type tractor adapted to characterize soil conditions during operation includes a slope sensor that provides a slope of the track-type tractor, a track speed sensor that provides a track speed of the track-type tractor, a processor coupled to the slope sensor and the track speed sensor, and a memory coupled to the processor. The memory stores a plurality of modules that are executed by the processor and cause the processor to access a nominal pull-slip curve stored in the memory, store data received from the slope sensor and the track speed sensor, calculate a coefficient of traction (COT) from drawbar pull and slope at slip percentages in a first range, divide values of the nominal pull-slip curve by the COT to produce a normalized pull-slip curve. The processor also determines an optimum operating state using the COT and the slope and provides the optimum operating state and a current operating point to a device for use in adjusting one or more current operating conditions.

In another aspect, a method of characterizing soil conditions during operation of a track-type tractor includes providing a nominal pull-slip curve corresponding to a standard soil condition, receiving, at a processor, data from at least one sensor of the track-type tractor, the data corresponding to a slope of the track-type tractor and one or more of a track speed, a ground speed, and a drawbar pull, and producing, at the processor, a coefficient of traction (COT). Producing the COT includes calculating a plurality of instantaneous pull-weight ratio values using the drawbar pull and the slope, removing instantaneous pull-weight ratio values from the plurality of instantaneous pull-weight ratio values that fail to meet a first screening criteria, and averaging the instantaneous pull-weight ratio values that meet the first screening criteria to produce the COT. The method further includes normalizing, at the processor, the nominal pull-slip curve by the COT to produce a normalized pull-slip curve, and producing, at the processor, a shear modulus adjustment factor that characterizes soil conditions. Producing the shear modulus adjustment factor includes calculating a plurality of normalized pull-weight ratio values, removing normalized pull-weight ratio values that fail to meet a second screening criteria, calculating the shear modulus adjustment factor from the normalized pull-weight ratio values meeting the second screening criteria, applying the shear modulus adjustment factor to the normalized pull-slip curve to obtain an adjusted pull-slip curve, and using the adjusted pull-slip curve, the COT, and the slope to determine an optimum performance. The method also includes providing the optimum performance to a device for use in adjusting a current operating state of the track-type tractor to reach the optimum performance.

In yet another aspect, a method of characterizing soil conditions during operation of a track-type tractor implemented by execution of computer-executable instructions stored on a computer readable memory storing computer-executable instructions includes providing a nominal pull-slip curve corresponding to a standard soil condition, receiving, at a processor, data from at least one sensor of the track-type tractor, the data corresponding to a slope of the track-type tractor and one or more of a track velocity, a ground speed, and a drawbar pull, and producing, at the processor, a coefficient of traction (COT). Producing the COT includes calculating a plurality of instantaneous pull-weight ratios using the drawbar pull and the slope, removing from the plurality of instantaneous pull-weight ratios the instantaneous pull-weight ratios that fail to meet a first screening criteria, the first screening criteria including removing the instantaneous pull-weight ratios corresponding to a slip value less than 20%, and averaging the instantaneous pull-weight ratios that meet the first screening criteria to produce the COT. The method may also include normalizing, at the processor, the nominal pull-slip curve by the COT to produce a normalized pull-slip curve, and producing, at the processor, a shear modulus adjustment factor. Producing the shear modulus adjustment factor includes calculating a plurality of normalized pull-weight ratio values, removing normalized pull-weight ratio values that fail to meet a second screening criteria, the second screening criteria including removing the normalized pull-weight ratio values corresponding to a slip outside a range of about 0.5% to about 40%, calculating the shear modulus adjustment factor from the normalized pull-weight ratio values meeting the second screening criteria, applying the shear modulus adjustment factor to the normalized pull-slip curve to obtain an adjusted pull-slip curve, and using the adjusted pull-slip curve, the COT, and the slope to determine an optimum performance. The method further includes providing the optimum performance to a device for use in adjusting an operating state of the track-type tractor to achieve a performance closer to the optimum performance.

BRIEF DESCRIPTION OF THE DRAWINGS

FIG. 22 shows an expanded cycle power equation.

DETAILED DESCRIPTION

Figure 1:
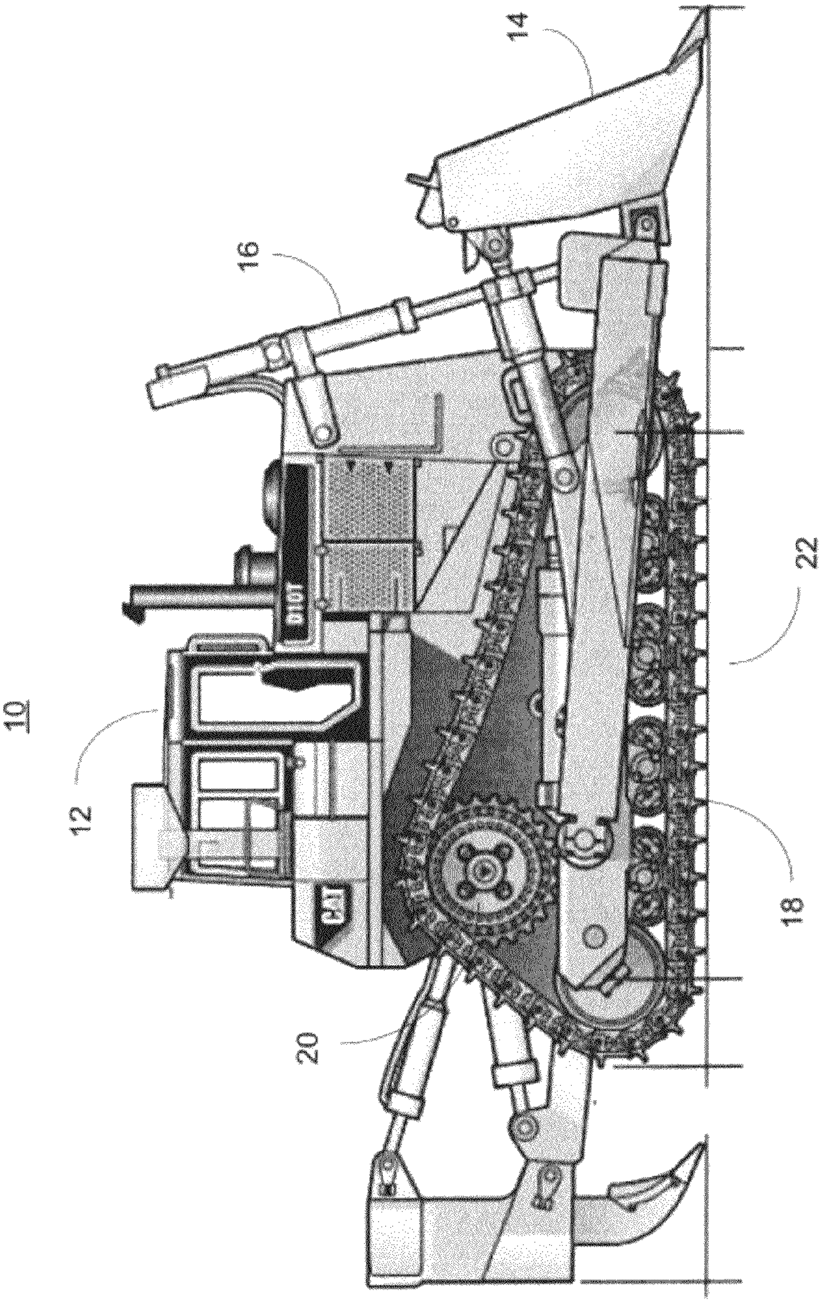
FIG. 1 is a simplified view of a track-type tractor.

Most major construction projects and many smaller projects require reshaping the earth on or around the worksite. Earth moving equipment comes in many shapes and sizes including, but not limited to, graders, backhoes, earthmovers, and bulldozers. Each of these different types of equipment is targeted to specific tasks related to earth moving. This disclosure is generally directed to a category of equipment referred to as track-type tractor and more specifically large track-type tractors using a front blade, such as a bulldozer.

In analyzing the performance of such machines, two major elements are at play, the operating conditions and the operating state. The operating condition or environment is generally described as those things outside the operator's control and include, but are not limited to, the slope of the work area, the material being moved, and the distance the material is moved, known as the cycle distance. Operating conditions also include the characteristics of the machine itself, such as weight and rolling resistance. Operating state generally refers to those things under the operator's control and include gear selection, engine speed, drawbar pull, track speed, and ground speed. Drawbar pull as used here refers to the force delivered to the tracks. This force may be expended primarily by moving the tractor, e.g., pushing a load, and by moving material under the track 18 in the form of track slip. Other force may be expended via friction losses and may be accounted for in drawbar pull. Conversely, energy diverted for other purposes such as air conditioning may be outside drawbar pull calculations but may affect overall operation.

When using a track-type tractor to reshape a site, the work of moving a volume of earth from one location to another may be broken into four distinct operations: load, carry, spread, and return. The load operation includes lowering a blade during forward motion to scrape soil from a particular area. The carry operation moves the removed soil to a new location and the spread operation allows the removed soil to unload from the blade, for example, by gradually lifting the blade and allowing the soil to fall underneath a blade edge. The return operation involves reversing the track-type tractor and driving back to a location to begin a new load operation. Collectively, the four operations may be referred to as a work cycle.

While operation of such equipment is simple in concept, the cost of owning and operating such large equipment invites, if not demands, the equipment be operated as close to its optimum performance as is possible. For example, very light loading of the blade may allow high speed operation but may require a significant increase in number of work cycles to accomplish the desired task. Alternatively, very heavy loading of the blade may substantially increase the amount of track slip and slow forward progress to a point that an excessive amount of time is required for a particular work cycle.

Further, the slope of a worksite will affect work cycle efficiency depending on whether the carry operation is uphill or downhill. Other factors may also affect selection of operating state, for example, operating at the highest possible speed in reverse may be efficient from a cycle time perspective. However, running at high speed may cause undue wear on components and negatively affect long term cost of operation and so may not be the overall best choice. For example, in some large tractors, the highest gear is prevented from use in reverse.

FIG. 1 is a simplified view of a track-type tractor 10. The tractor 10 may include a cab 12, a blade 14 operated by one or more hydraulic elements 16 and a track 18, usually one of a pair of tracks, made up of shoes (not individually depicted) that is driven by a drive wheel 20. The track 18 may engage a surface of a worksite 22, such as soil, gravel, clay, existing structures, etc. When describing operation of the tractor at an angle, a fore-aft angle $\theta$ may be measured between a plane of the track 18 and the horizontal. Similarly, a side slope of an angle $\phi$ may be measured between a line through both tracks 18 and the horizontal. As used below, a composite of side slope and fore-aft slope is combined and referred to simply as angle $\theta$.

Figure 2:
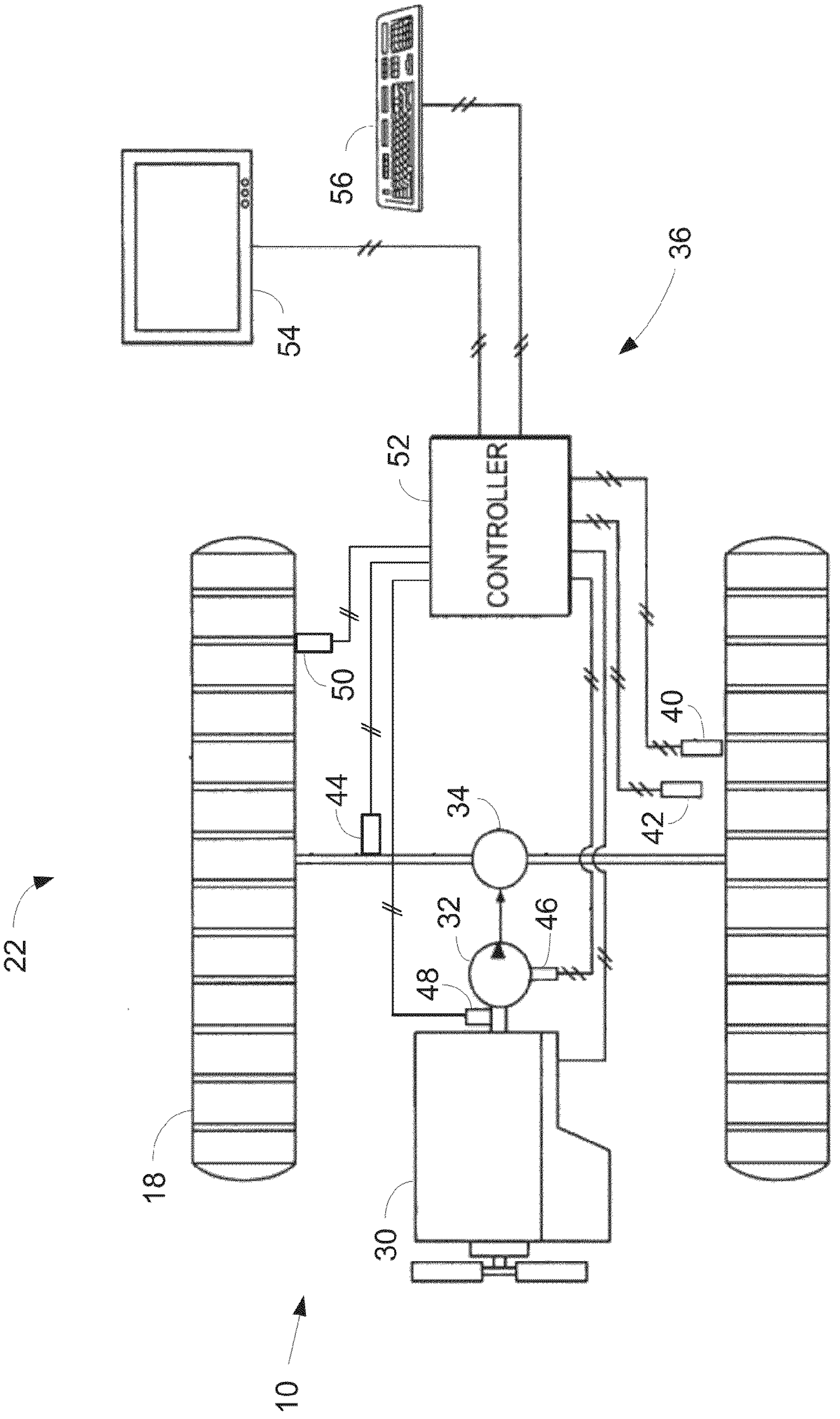
FIG. 2 is a diagrammatic illustration of a track-type tractor control system.

FIG. 2 illustrates a worksite 22 with an exemplary track-type tractor 10 performing a predetermined task. Worksite 22 may include, for example, a mine site, a landfill, a quarry, a construction site, or any other type of worksite 22. The predetermined task may be associated with altering the current geography at worksite 22 and may include, for example, a grading operation, a scraping operation, a leveling operation, a bulk material removal operation, or any other type of geography altering operation at worksite 22.

Track-type tractor 10 may embody a mobile machine that performs some type of operation associated with an industry such as mining, construction, farming, or any other industry. For example, track-type tractor 10 may be an earth moving machine such as a dozer having a blade 14 or other work implement movable by way of one or more motors or hydraulic cylinders 16. Track-type tractor 10 may also include one or more traction devices 18, which may function to steer and/or propel track-type tractor 10.

As best illustrated in FIG. 2, track-type tractor 10 may include an engine 30 and a transmission 32 coupling engine 30 to traction devices 18.

Engine 30 may embody an internal combustion engine such as, for example, a diesel engine, a gasoline engine, a gaseous fuel powered engine, or any other type of engine apparent to one skilled in the art. Engine 30 may alternatively or additionally include a non-combustion source of power such as a fuel cell, a power storage device, an electric motor, or other similar mechanism. Engine 30 may be connected to transmission 32 via a direct mechanical coupling, an electric or hydraulic circuit, or in any other suitable manner.

Transmission 32, in some embodiments, may include a torque converter drivably connected to engine 30. Transmission 32 may produce a stream of pressurized fluid directed to a motor 34 associated with at least one traction device 18 to drive the motion thereof. Alternatively, particularly in non-track-type tractor embodiments, transmission 32 could include a generator configured to produce an electrical current used to drive an electric motor associated with any one or all of traction devices 18, a mechanical transmission device, or any other appropriate means known in the art.

Track-type tractor 10 may also include a control system 36 in communication with components of track-type tractor 10 and engine 30 to monitor and affect the operation of track-type tractor 10. In particular, the control system 36 may include a ground speed sensor 40, an inclinometer 42, a torque sensor 44, a pump pressure sensor 46, an engine speed sensor 48, a track speed sensor 50, a controller 52, an operator display device 54, and an operator interface device 56. Controller 52 may be in communication with the engine 30, ground speed sensor 40, inclinometer 42, a torque sensor 44, a pump pressure sensor 46, an engine speed sensor 48, a track speed sensor 50, an operator display device 54, and an operator interface device 56 via respective communication links. When the transmission 32 is a mechanical transmission, the transmission 32 may include a gear sensor (not depicted).

Ground speed sensor 40 may be used to determine a ground speed of track-type tractor 10. For example, ground speed sensor 40 may embody an electronic receiver that communicates with one or more satellites (not shown) or a local radio or laser transmitting system to determine a relative location and speed of itself. Ground speed sensor 40 may receive and analyze high-frequency, low power radio or laser signals from multiple locations to triangulate a relative 3-D position and speed. Ground speed sensor 40 may also, or alternatively, include a ground-sensing radar system to determine the travel speed of the track-type tractor 10. Alternatively, ground speed sensor 40 may embody an Inertial Reference Unit (IRU), a position sensor associated with traction device 18, or any other known locating and speed sensing device operable to receive or determine positional information associated with track-type tractor 10. A signal indicative of this position and speed may be communicated from speed sensor 48 to controller 52 via its communication link.

Inclinometer 42 may be a grade detector associated with track-type tractor 10 and may continuously detect an inclination of track-type tractor 10. In one exemplary embodiment, inclinometer 42 may be associated with or fixedly corrected to a frame of track-type tractor 10. However, inclinometer 42 may be located on any stable surface of track-type tractor 10. In one exemplary embodiment, inclinometer 42 may detect incline in any direction, including a forward-aft direction and side-to-side direction, and responsively generate and send an incline signal to controller 52. It should be noted that although this disclosure describes inclinometer 42 as the grade detector, other grade detectors may be used. In one exemplary embodiment, the grade detector may include two or three GPS receivers, stationed variously around the track-type tractor 10. By knowing the positional difference of the receivers, the inclination of track-type tractor 10 may be calculated. Other grade detectors also may be used.

Torque sensor 44 may be operably associated with transmission 32 to directly sense torque output and/or output speed of transmission 32. It is contemplated that alternative techniques for determining torque output may be implemented such as monitoring various parameters of track-type tractor 10 and responsively determining a value of output torque from transmission 32, or by monitoring a torque command sent to transmission 32. For example, engine speed, torque converter output speed, transmission output speed, and other parameters may be used, as is well known in the art, to compute output torque from transmission 32. Torque sensor 44 may send to controller 52 a signal indicative of the torque output and/or output speed of transmission 32. Torque may be used in calculating drawbar pull (DBP), a component of performance measurement as discussed in more detail below.

Pump pressure sensor 46 may be mounted to transmission 32 to sense the pump pressure. In particular, pump pressure sensor 46 may embody a strain gauge-type sensor, a piezoresistive type pressure sensor, or any other type of pressure sensing device known in the art. Pump pressure sensor 46 may generate a signal indicative of the pump pressure and send this signal to controller 52 via an associated communication link.

Engine speed sensor 48 may be operably associated with the engine 30 to detect the speed of engine 30. In one exemplary embodiment, engine speed sensor 48 may measure the rotations per minute (rpm) of an output shaft or cam shaft.

The track speed sensor 50 may be used to determine the speed of the track 18. A second track speed sensor (not depicted) may be used to determine the speed of the other track 18 so that a differential of track speed may be determined. In combination with the ground speed sensor 40, a value of track slip, also referred to simply as slip, may be calculated, which is a function of ground speed and track speed.

Operator display device 54 may include a graphical display stationed proximate the operator in an operator station (not depicted) to reflect the status and/or performance of track-type tractor 10 or systems or components thereof to the operator. Operator display device 54 may be one of a liquid crystal display, a CRT, a PDA, a plasma display, a touchscreen, a monitor, a portable hand-held device, or any other display known in the art.

Operator interface device 56 may enable an operator of track-type tractor 10 to interact with controller 52. Operator interface device 56 may comprise a keyboard, steering wheel, joystick, mouse, touch screen, voice recognition software, or any other input device known in the art to allow an operator to interact with controller 52. Interaction may include operator requests for specific categorized information from controller 52 to be displayed via operator display device 54.

Controller 52 may determine a current operating mode from a manual indication of an operator via operator interface device 56. For example, operator interface device 56 may contain buttons or any other method of indicating to controller 52 the intended operating mode. It is also contemplated that controller 52 may automatically determine current operating mode by receiving input from operator interface device 56 and analyzing the input. For example, operator interface device 56 may include one or more joysticks to control both track-type tractor 10 and work implement 14. As an operator of track-type tractor 10 manipulates operator interface device 56 to steer track-type tractor 10 around worksite 22 and to operate work implement 14 to alter the geography of worksite 22, operator interface device 56 may send the operating signals to controller 52. Controller 52 may then affect the operation of engine 30 and related drive train components accordingly to correspond with the requested manipulation. In addition to using the signals from operator interface device 56 to control track-type tractor 10 and work implement 14, controller 52 may further analyze the signals to automatically determine a machine operating mode. For example, when an operator uses operator interface device 56 to request a downward movement of work implement 14 into worksite 22, controller 52 may determine that track-type tractor 10 is in a load mode. Alternatively, if an operator requests work implement 14 to remain engaged with worksite 22 while requesting transmission 32 to propel traction devices 18, controller 52 may determine that track-type tractor 10 is in a carry mode. By analyzing the requested or measured location and orientation of work implement 14, the requested or measured pressures of hydraulic cylinders 16, the requested or measured speed of traction devices 18, and/or the requested or measured parameters of any component of track-type tractor 10, controller 52 may automatically determine a current operating mode. Controller 52 may include appropriate hardware or software for performing such an analysis.

Figure 3:
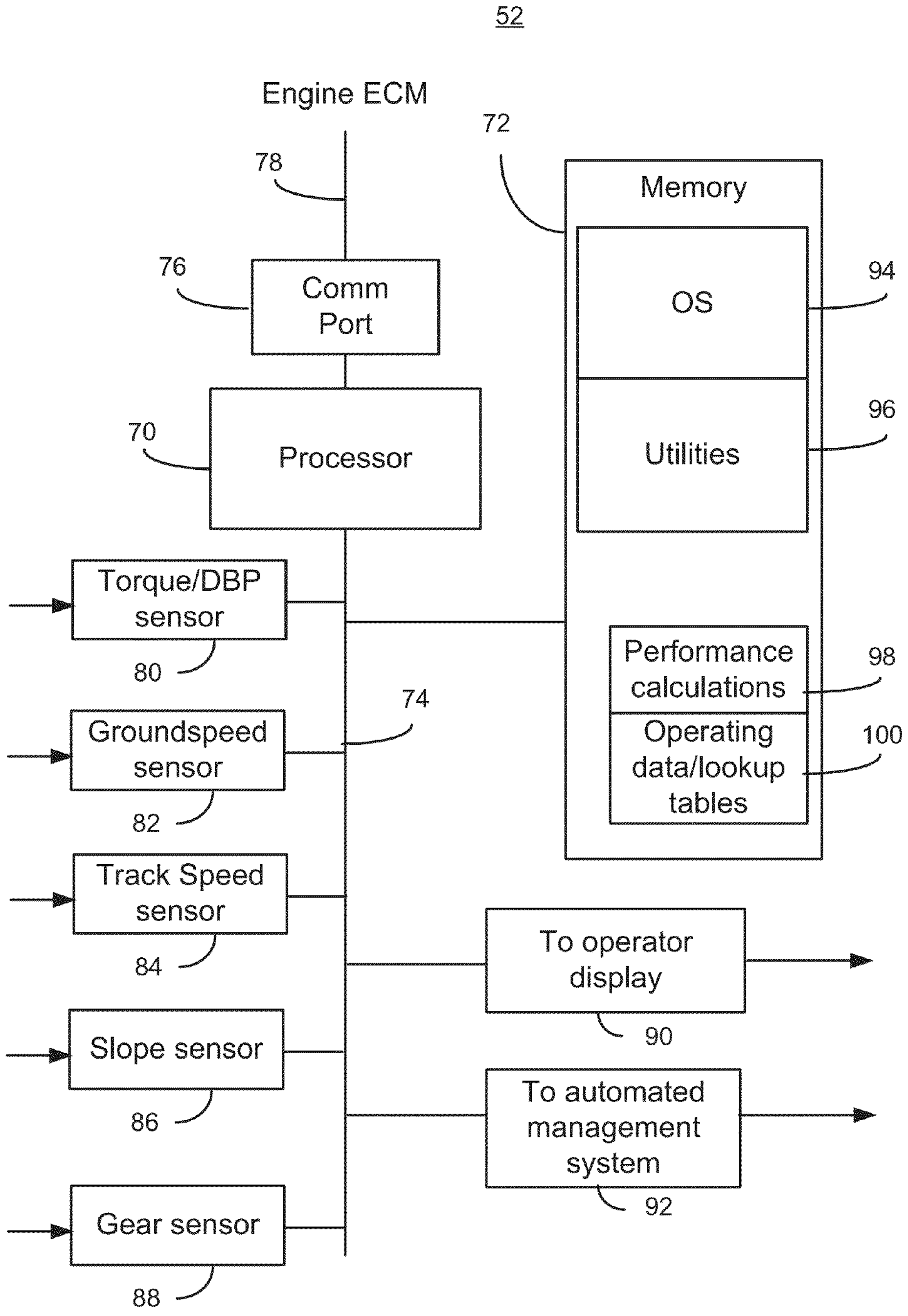
FIG. 3 is a simplified and exemplary block diagram illustrating components of a controller used to measure and optimize performance in a track-type tractor.

FIG. 3 illustrates an exemplary controller 52. The controller 52 may include a processor 70 and a computer readable memory 72 connected by a bus 74. The processor 70 may be any of a number of known computer processor architectures, including, but not limited to, single chip processors or conventional computer architectures. The computer readable memory 72 may be any combination of volatile and non-volatile memory, including rotating media, flash memory, conventional RAM, ROM or other non-volatile programmable memory, but does not include carrier waves or other propagated media. The controller 52 may also include a communication port 76 providing support for communication with external devices, such as an engine computer or radio for communication with an external system, via a network 78.

A series of sensor inputs may be coupled to the bus 74. Each sensor input may have a common configuration but in some cases may be tailored to a particular sensor type and may provide specific conversion or conditioning based on the sensor to which it is coupled. For example, a sensor input coupled to an analog device may provide an analog-to-digital conversion. In an embodiment, sensor inputs may include a torque or drawbar pull sensor input 80, a groundspeed sensor input 82, a track speed sensor input 84, a slope sensor input 86, and a gear sensor input 88, when needed.

Several outputs may also be provided, including but not limited to, an output 90 that drives an operator display device 54, an output 92 that drives an automatic control system (not depicted), for example, that manages blade load.

The memory 72 may include storage for various aspects of operation of the controller 52 including various modules implementing an operating system 94, utilities 96, and operational programs 98, as well as short-term and long-term storage 100 for various settings and variables used during operation.

The operational programs 98 may include a number of modules that perform functions described below. Such modules may include, but are not limited to, an input module that receives data corresponding to both an operating condition of the track-type tractor 10 and an operating state of the track-type tractor 10, a performance module that calculates a cycle power value for the track-type tractor 10, an optimizer module that calculates performance levels for a range of input states and identifies an optimum performance level and an optimum operating state of the track-type tractor 10. The modules may also include a scaling module that prepares a weighted target range of operation as a non-linear representation of performance values so that the weighted target range is a subset of performance values centered at the optimum performance level. This may allow a narrow range of values near the optimum performance level to be weighted more heavily than performance values outside the weighted target range. The modules may also include a normalization module that divides the cycle power value by the optimum performance level to create a normalized performance level and a display module that presents the normalized performance level relative to the weighted target range for use by an operator in adjusting the operating state of the track-type tractor 10, the target range. These functions are discussed in more detail below.

Figure 4:
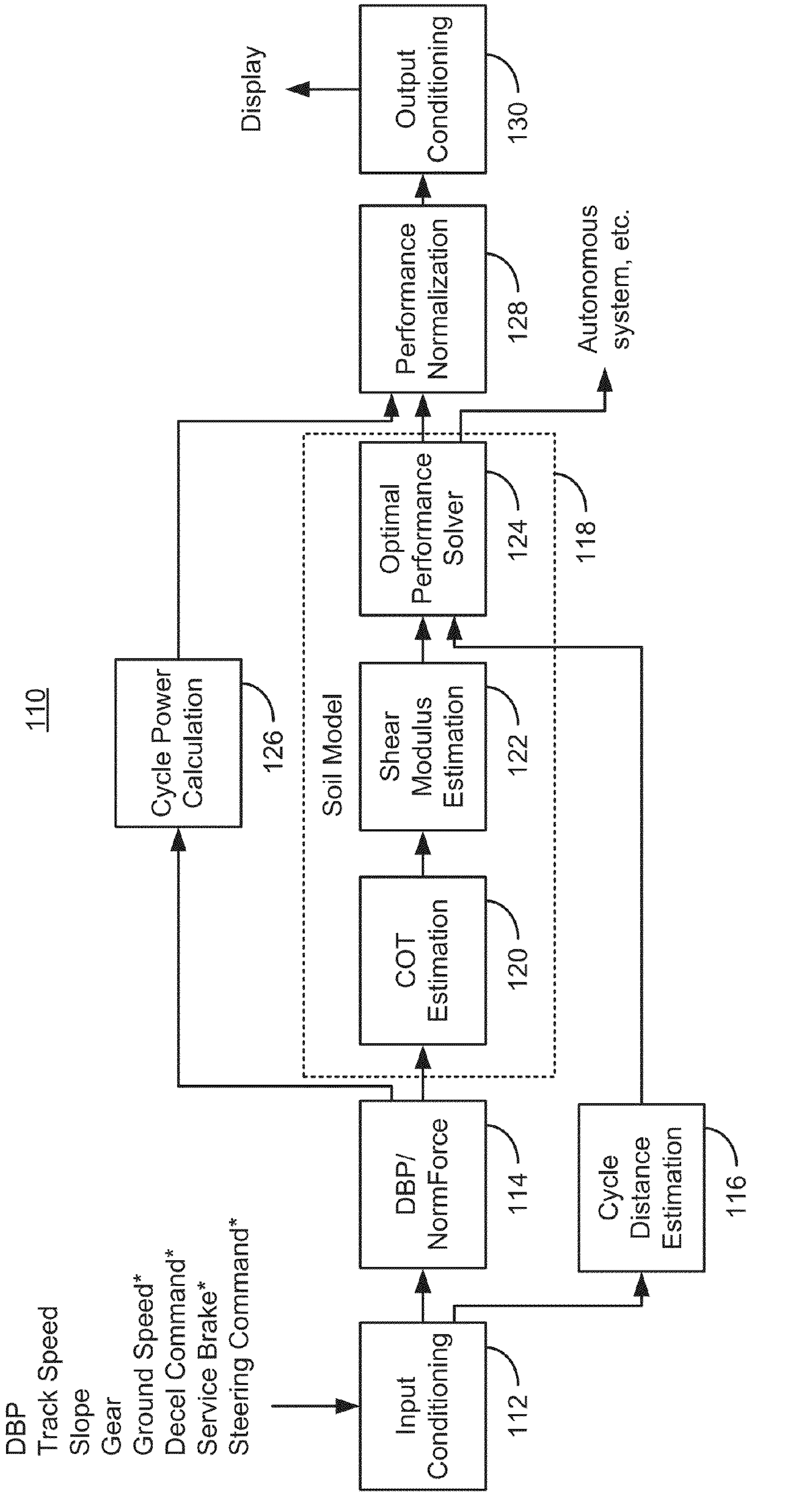
FIG. 4 is a flow chart illustrating a method of measuring and calculating tractor performance.

FIG. 4 is a flow chart illustrating a method 110 of measuring and calculating tractor performance. Overall, the goal of the system and method disclosed here is to estimate a current optimum performance and optimum operating state for a track-type tractor 10, measure a current performance and operating state, and present an output based on a comparison of the two. In one embodiment, the output may be to an automated system used to adjust an operating state of the track-type tractor 10. In another embodiment, the output may be directed to an operator display so that the operator can visually see the tractor's current performance compared to the optimum performance so that the operator can adjust the operating state accordingly.

Track-Type Tractor Performance

Regarding nomenclature, the following definitions are understood to mean the following: Operating conditions or operating environment refer to things out of the operator's immediate control, including slope, material parameters, and cycle distance. Operating state refers to things under the operator's control, including gear, engine speed, drawbar pull, track speed, and ground speed. Further, several abbreviations are used below, particularly in equations, these terms are defined as:

DBP=drawbar force

RollRes=rolling resistance m=machine mass g=gravitational constant $\theta_{Pitch}$=slope $v_{GndSpd}$=ground speed $v_{TrkSpd}$=track speed $v_{rev}$=track speed in reverse $T_{Carry}$=carry duration $T_{Cycle}$=cycle duration $T_{Load}$=load segment duration $d_{Load}$=load segment distance $T_{Spread}$=spread segment duration $d_{Spread}$=spread segment distance $d_{carry}$=carry distance $d_{cycle}$=cycle distance (that is, the forward travel of the track-type tractor 10)

Track type tractors (TTT) are limited in the amount of torque they can generate by three primary factors:

1) Engine/driveline capabilities

2) Machine weight

3) Track and soil interactions

Figure 5:
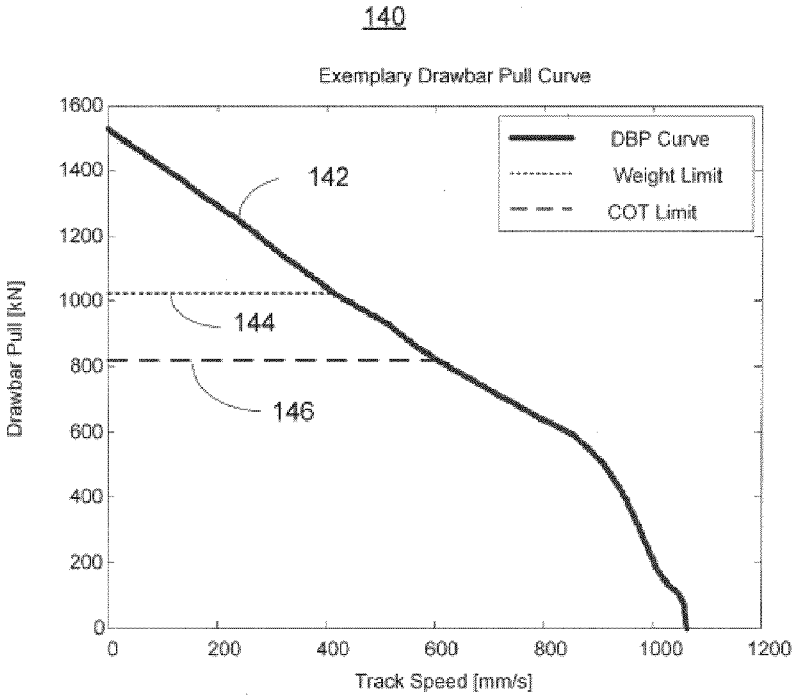
FIG. 5 illustrates an exemplary drawbar pull vs. track speed curve.

Referring to FIG. 5, a graph 140 illustrates driveline capabilities (engine 30, torque converter and/or transmission 32) as represented by a drawbar pull (DBP) curve 142. The area under the drawbar pull curve 142 is track power, representing the maximum amount of power the tractor 10 can deliver. The DBP curve 142 illustrates, for an exemplary track-type tractor 10, that the highest DBP, measured in kiloNewtons, is developed at low track speed. Two practical limits also apply to the DBP curve 142 as the driveline cannot generate a greater propulsive force through the tracks 18 than the material can support through a resistive force. The first, illustrated by the weight limit line 144, is that the amount of propulsive force delivered is limited by the weight of the machine. More specifically, the resistive force generated by the material is a function of the normal force of the tractor 10 through the contribution of the frictional component of the soil strength. At best, soil can produce a resistive force equal to the normal force of the tractor 10. That is, the normal force of the tractor 10 on the work surface under ideal conditions limits the amount of propulsive force delivered to, for example, the load on the blade 14. However, the work surface rarely provides an ideal condition with respect to soil strength.

With respect to the second practical limit, intuitively, a dry clay work surface provides better traction than sand or snow. Therefore, the second, lower, limit line is known as the coefficient of traction (COT) limit 146. The COT limit is a function of the surface area of the track 18 in contact with the material which contributes to the maximum tractive capacity through cohesive strength of the soil. The DBP curve for a particular tractor may be used to estimate DBP in terms of track speed as found in the optimum performance solver calculations below.

Figure 6:
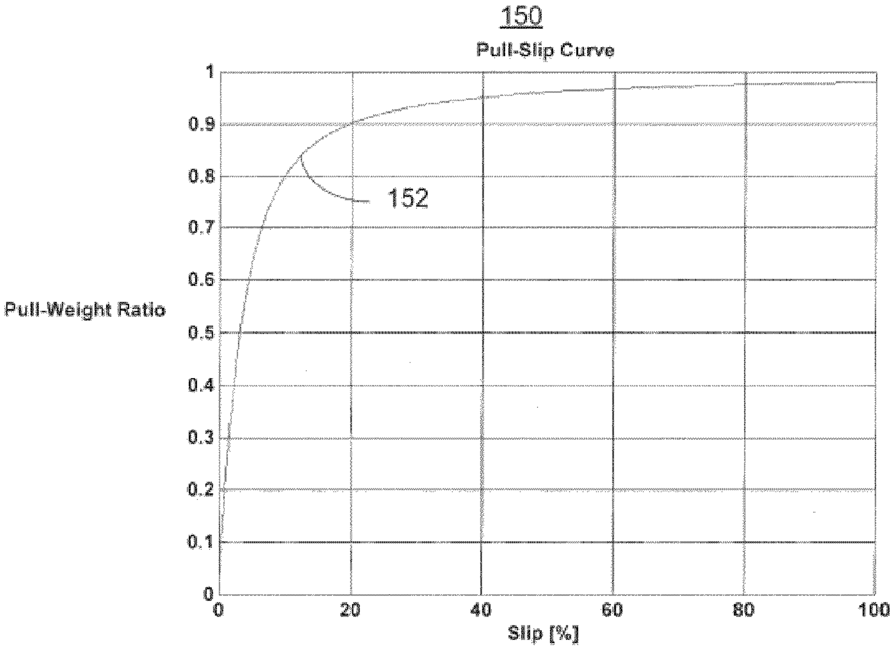
FIG. 6 illustrates a nominal pull-slip curve.

The effect of soil conditions are further exemplified by the graph 150 in FIG. 6 by a pull-slip curve 152. The pull-slip curve 152 characterizes a ratio of drawbar pull and weight of the tractor 10 vs. track slip. Slip may be measured when ground speed and track speed are both available, but in some cases, slip may need to be estimated using other quantities. To summarize the graph 150, when track slip is at or near zero, drawbar pull values are also very low, for example, when carrying a very light load. At the other end of the curve 152, when track slip is at 100%, the drawbar pull is virtually equal to the shear strength of the soil. At both ends of the curve 152, little or no work is produced either because the load is extremely light or the tracks slip so much there is no forward progress. There is a range of slip values near the knee of the curve 152 where peak performance is achieved.

Returning to FIG. 4, the method 110 begins at a block 112 to capture and condition, as required, inputs used in estimating actual performance and an optimum performance, such as optimum track speed. Inputs may include drawbar pull, track speed, slope and gear. Other inputs may include ground speed, an engine deceleration command, a service brake command, and a steering command. While useful, inputs in this latter set are not always required. Input conditioning may involve input value conversion, such as converting analog signals to digital signals, protocol conversions, such as 4-20 ma sensor input conversion, or scaling of input values for easier use in subsequent calculations.

At block 114, the drawbar pull (DBP) and normal force may be determined. DBP is difficult to measure directly and is calculated from measured quantities such as drive shaft torque, torque converter measurements, or other techniques beyond the scope of the current discussion. Normal force is the weight of the track-type tractor 10 after accounting for the slope of the work surface, as discussed in more detail below.

The soil model subsystem 118 includes blocks for estimating COT 120, estimating shear modulus 122 (related to soil conditions) and a performance solver 124 that determines an optimum performance for the current operating environment. Each of these are discussed in more detail below.

A block 116 estimates cycle distance for use in developing the solution for optimum performance at block 124. Cycle distance, the forward portion of the work cycle, is assumed to be the same as the reverse distance, allowing cycle distance to be estimated during reverse segments, $$d_{cycle} = \int_{Rev} v_{gnd}\,dt \tag{1}$$

where $v_{gnd}$ is the ground speed.

Similarly, the carry distance to cycle distance ratio can be calculated because, as noted above, the $d_{Load}$ and $d_{Spread}$ portions of the cycle are relatively fixed in normal operation so that the carry portion of the work cycle is a fixed ratio of the cycle distance:

$$\frac{d_{carry}}{d_{cycle}} = \text{constant} \tag{2}$$

$$d_{carry} = d_{cycle}\frac{d_{carry}}{d_{cycle}} \tag{3}$$

Eq. 3 uses the ratio of $d_{carry}$ to $d_{cycle}$ as a constant, e.g., in an embodiment, 0.9, then $d_{carry}$ can be calculated as the product of that $d_{cycle}$ with the constant. The value of $d_{carry}$ is used for calculating performance below.

Reverse speed is determined by estimating the resistive force during reverse:

$$(F_{Res} = \text{RollRes} + mg\sin(-\theta\text{Pitch})) \tag{4}$$

Figure 7:
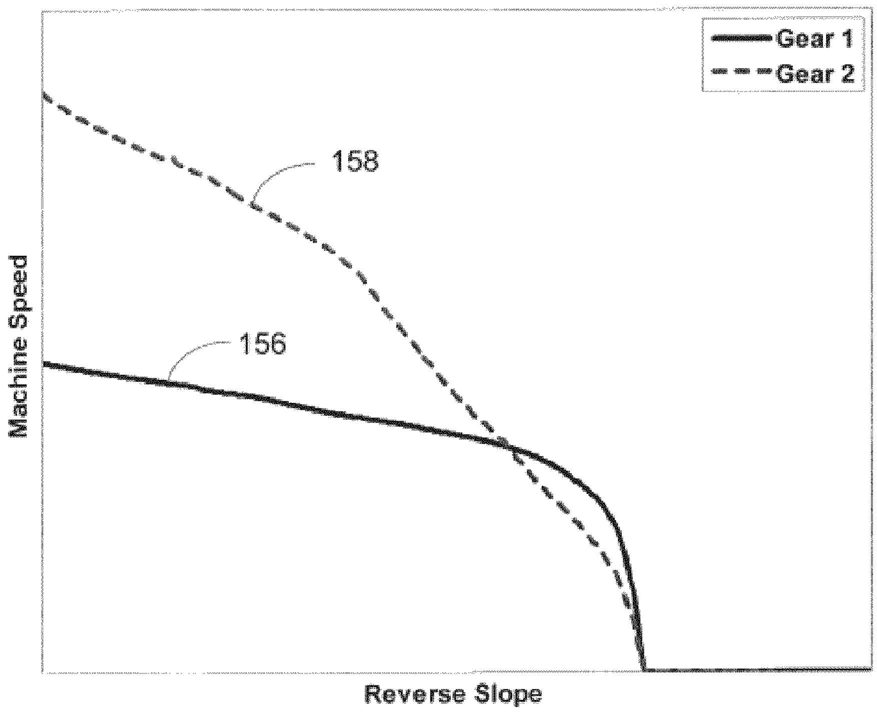
FIG. 7 illustrates an exemplary reverse speed vs. slope graph.

Using this resistive force as the drawbar force required to propel the machine in reverse, the 1R (first reverse gear) and 2R (second reverse gear) drawbar pull curves can then be used to estimate run-out track speeds. The estimated soil properties (discussed below) and the calculated resistive force in equation (4) can be used to estimate a reverse slip. The estimated reverse track speeds and slips allow an estimation of reverse ground speeds for the relative gears. In other embodiments, more than two reverse gears may be available. The maximum ground speed from the available reverse gears is used as the estimated reverse target speed. FIG. 7 is an exemplary graph 154 of reverse tractor speed in reverse gear 1 156 and reverse gear 2 158 vs. a slope of the work surface. Note that at some slopes and for some soil properties, the tractor 10 has a higher reverse speed in gear 1 than in gear 2.

The output of block 124 may be used to drive auto-loading functions such as an automated blade lift system that adjusts blade depth to increase or decrease load to achieve optimum loading. Alternatively, a target ground speed may be provided to a performance management system to achieve a target operating state.

A block 126 calculates cycle power, or current performance. Cycle power is only one formulation of performance and others may be used. For example, other measures of performance may include track power, ground power, blade power, and a volumetric production. Any combination of sensor inputs that provide the required data for performance in any of these formulations may be used in the following description of measuring and displaying tractor performance. For the purpose of this disclosure, performance will be focused on cycle power and defined as:

$$\text{Cycle Power} = (DBP - RollRes - mg\sin\theta_{Pitch})v_{GndSpd}\frac{T_{Carry}}{T_{Cycle}} \tag{5}$$

where, $$v_{GndSpd} = v_{TrkSpd}(1 - \text{slip}/100) \tag{6}$$

and $$\frac{T_{carry}}{T_{cycle}} = \frac{\frac{d_{carry}}{v_{gnd}}}{T_{Load} + \frac{d_{carry}}{v_{gnd}} + T_{spread}\frac{d_{cycle}}{v_{rev}}} \tag{7}$$

and may be stated equivalently as:

$$\frac{T_{carry}}{T_{cycle}} = \frac{1}{1 + \frac{v_{gnd}}{v_{rev}}\frac{d_{cycle}}{d_{carry}} + (T_{Load} + T_{spread})\frac{v_{gnd}}{d_{carry}}} \tag{8}$$

A block 128 develops a comparison between the current cycle power from block 126 and the optimum cycle power calculated at block 124.

A block 130 may also take the output of block 128 and condition it for use in display to an operator. For example, optimum and current performance may be normalized and expanded over a narrow range of interest so that the operator is given an easy-to-understand graphical representation suitable for adjusting operating state to maintain or increase performance.

Coefficient of Traction

Figure 8:
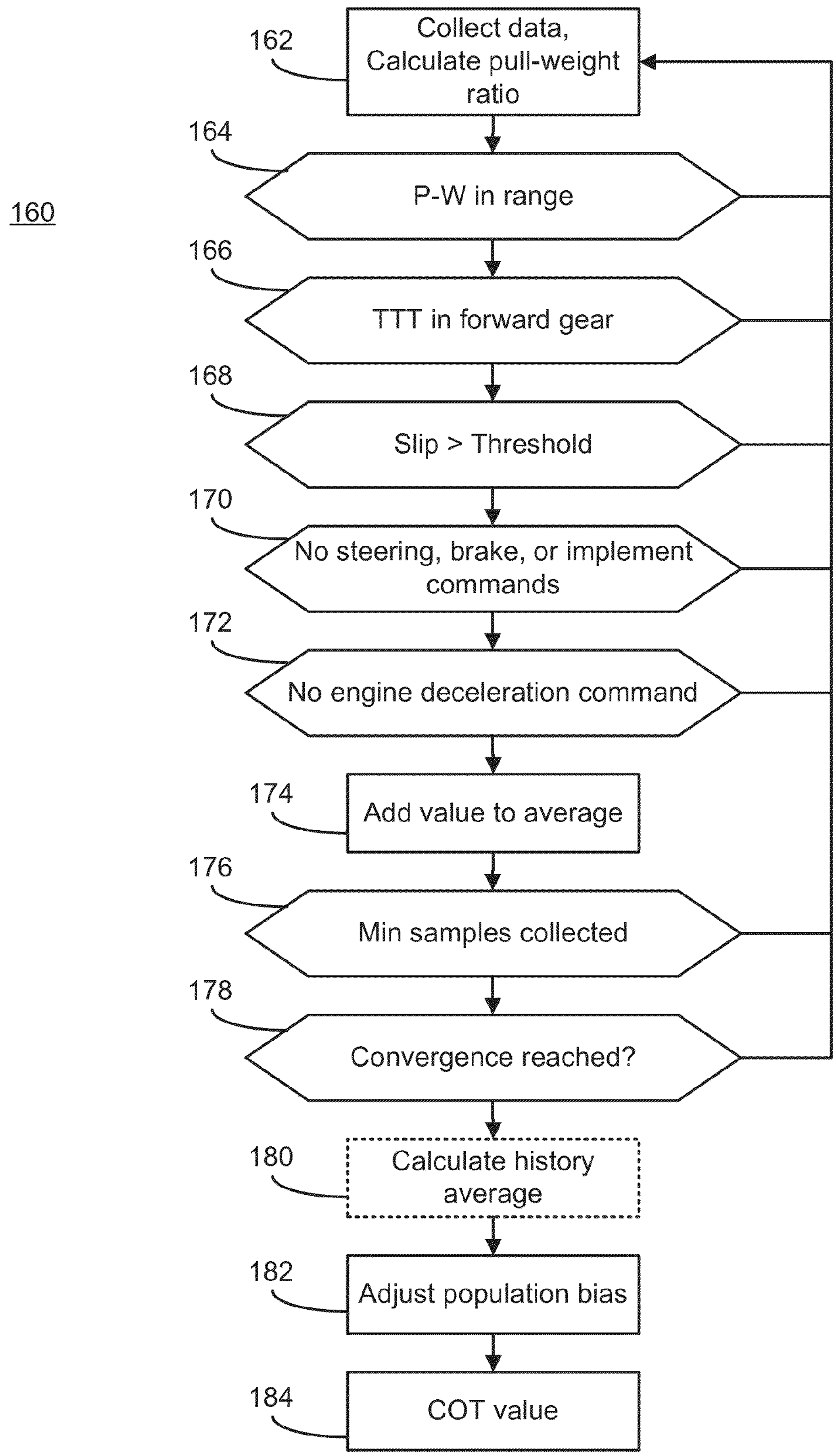
FIG. 8 is a flow chart illustrating determination of a coefficient of traction (COT)

The estimation of COT in block 120 of FIG. 4 is shown in more detail in FIG. 8, a flow chart of a method 160 illustrating estimation of coefficient of traction (COT). COT adjusts the nominal pull-slip curve 152 and applies mainly to the portion of the pull-slip curve 152 above about 20% slip, see, e.g., FIG. 6 and FIG. 10, discussed below. At a block 162, data related to DBP, slope, and known values of rolling resistance and mass are collected. From these a value of pull-weight ratio (PWratio), which is a fraction of delivered propulsive force over the normal force and is calculated as:

$$PWratio = \frac{DBP - RollRes}{mg\cos\theta_{Pitch}} \tag{9}$$

where RollRes can be estimated as a function of normal force for a given machine and the normal force is the product of tractor mass (m) and gravitational acceleration (g, or −9.8 $m/s^2$) as adjusted for slope. For level ground with angle 0, cos(0)=1 and the full weight of the tractor 10 is developed as normal force.

Optimum Performance Solver

When a value of PWratio is calculated, a series of screens are applied at blocks 164-172 to determine whether to keep the value. Failure to meet the criteria at any of these points causes the current value to be discarded and the process is continued at block 162. At block 164, the PWratio is checked to determine whether it is in an acceptable range. For example, in an embodiment, the PWratio must be between 0.5 and 1.2. (Under some conditions, PWratios above 1.0 can be generated for a short duration.)

At block 166, the tractor 10 must be operating in a forward gear. At block 168, if ground speed is known, the slip may be restricted to values above a knee of the nominal pull-slip curve 152. For example, in an embodiment, slip must be greater than 20%. If the ground speed is not known, block 168 may be skipped.

False COT estimates may be caused when a PWratio calculation is artificially high or low. This can be caused when measured driveline torque is diverted from producing tractive force. Therefore, to prevent false readings, at block 170 the PWratio value is discarded when steering, brakes, or implements are engaged. Similarly, at block 172, the PWratio value is discarded if the engine deceleration pedal is active as it will reduce generated pull.

At block 174, PWratio values that pass the screens are added to previous values and averaged, before performing validation tests for data population and data convergence. At block 176, a data population test is performed to check on the number of samples in the average. In an embodiment, a minimum of 200-400 samples are taken. If the number of samples meets the data population criteria, the routine continues at block 178.

At block 178, a convergence test is performed where the standard deviation of the samples is evaluated and if the standard deviation is less than a threshold, the COT value is accepted. In an embodiment, the standard deviation value may be 0.05. Optionally, at block 180, several COT estimates may be averaged to account for soft spots in a cycle or an artificially high or low value due to differences in ground conditions.

Figure 9:
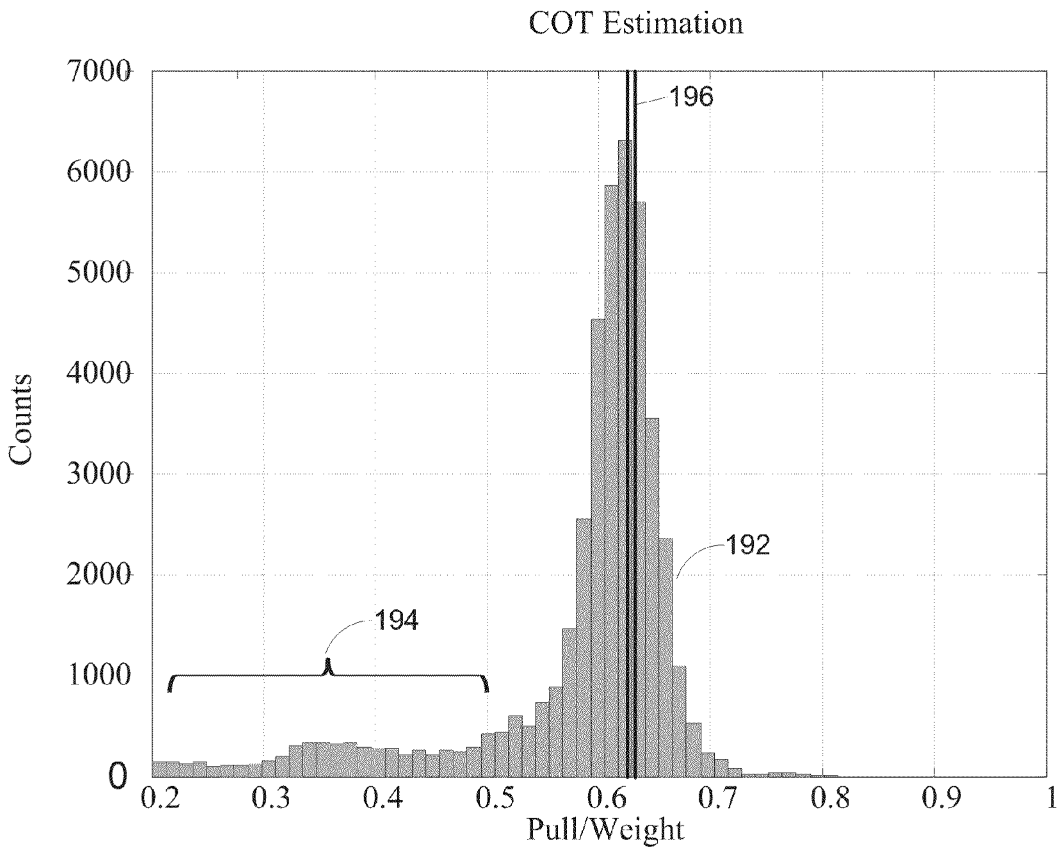
FIG. 9 illustrates a histogram of COT estimates illustrating a noise tail.

Particularly when ground speed is not available, an adjustment for population bias may be made at block 182. Referring briefly to FIG. 9, a histogram of COT samples 192 shows a tail 194 due to noise and other effects. The COT estimate 196 may be offset or increased by a multiple of the standard deviation of the PWratio values to account for the noise and other effects. Returning to FIG. 8, following the adjustment for population bias, at block 184 a final value for COT is developed and stored for later use in the performance calculation process.

Figure 10:
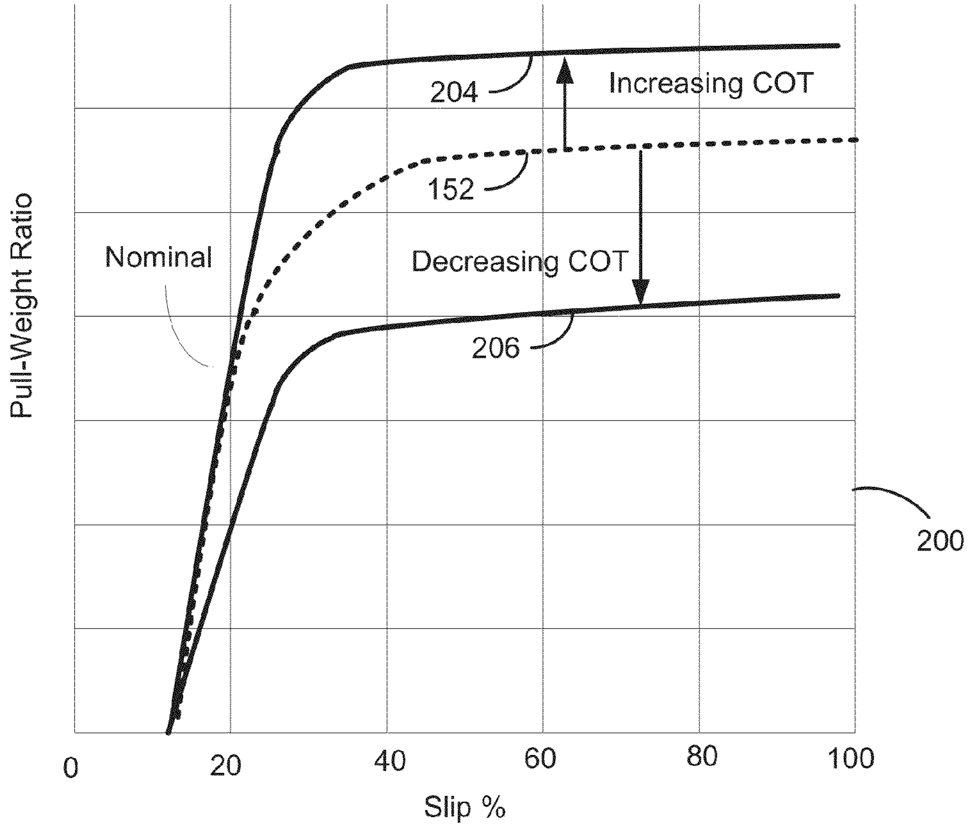
FIG. 10 illustrates a nominal pull slip curve adjusted for coefficient of traction.

FIG. 10 is a graph 200 that illustrates the effect of COT on the pull-slip curve 152 of FIG. 6. Starting with a nominal pull-slip curve 152 representing typical soil conditions, increasing COT has the effect of moving up the pull-slip curve 152 having a greater impact on the portion above the knee, that is, generally along a horizontal asymptote and in a range above about 15-40% slip, resulting in a pull-slip curve 204. That is, an increase in coefficient of traction allows a higher pull-weight ratio for a given value of slip. Conversely, a decreasing coefficient of traction lowers the pull-slip ratio for a given slip, as shown by curve 206.

In an exemplary implementation for a given operating condition and operating state, COT values may be in a range of about 0.625 to about 0.635.

Shear Modulus Factor

Figure 11:
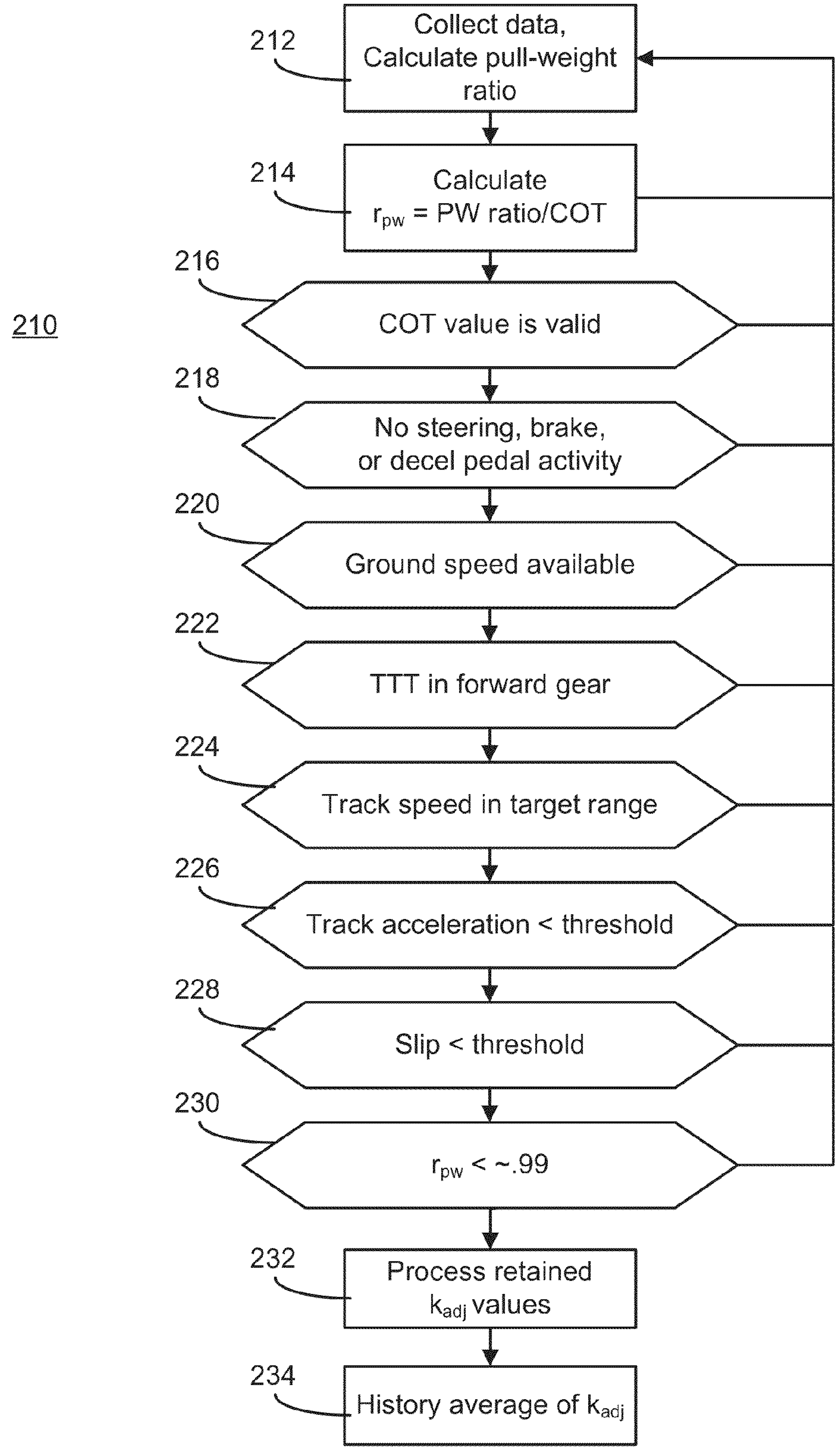
FIG. 11 is a flow chart illustrating determination of a shear modulus adjustment factor.

In applications where the ground speed is available, a shear modulus adjustment factor may be developed and used to more completely determine the pull-slip curve 152. FIG. 11 is a flow chart of a method 210 illustrating determination of a shear modulus adjustment factor '$k_{adj}$' that corresponds to block 122 of FIG. 4.

Many empirical formulations exist to characterize the pull-slip curve 152 of FIG. 6. These formulations generally have the form of an exponential recovery function with the exponential rate characterized by the soil shear deformation modulus, k. Shear modulus is a characterization of soil deformation and ranges in value from around 60 mm for well compacted clay to above 250 mm for fresh snow. One exemplary formulation is:

$$PWratio = \mathrm{COT}\left(1 - \frac{k}{\mathrm{slip} * len} + \frac{k}{(\mathrm{slip} * len)}e^{-slip*len/k}\right) \tag{10}$$

where len=track length.

A nominal track soil model is defined for a nominal set of conditions to create a nominal pull-slip curve 152.

$$\mathrm{PWratio}_{nominal} = \mathrm{COT}*f(\mathrm{slip}) \tag{11}$$

While the track soil model is directed to track-type machines, soil models for wheeled machines, such as agricultural tractors, wheel tractor scrapers, compactors, etc., have a similar shape and these applications lend themselves to similar modeling.

The exponential rate of the nominal pull-slip curve 152 can then be adjusted to allow the nominal pull-slip curve 152 to represent various conditions of track soil interaction by applying a shear modulus adjustment factor to the slip axis of the nominal pull-slip curve 152.

$$PWratio_{adj} = \mathrm{COT} * f\left(\frac{\mathrm{slip}}{k_{adj}}\right) \quad (12)$$

As in FIG. 8, a pull-weight ratio is determined for a current operating condition and current operating state. At block 214, the pull-weight ratio from block 212 is normalized by dividing the value from block 214 with the COT value from block 184 of FIG. 8 to produce an intermediate value $r_{pw}$. The value of $r_{pw}$ is a function of slip and the shear modulus factor $k_{adj}$ as shown in Eq. 13 below. A data fitting technique, such as a least squares estimation algorithm may be used to develop the shear modulus factor.

$$r_{PW} = f(s/k_{adj}) \quad (13)$$

$$R^2 \equiv \sum [s - s'k_{adj}]^2 \quad (14)$$

$$s = f^{-1}(r_{PW})k_{adj} = s'k_{adj} \quad (15)$$

$$\frac{\partial R^2}{\partial k} = -2\sum [s - s'k_{adj}]s' = 0 \quad (16)$$

$$k_{adj} = \frac{\sum ss'}{\sum s'^2} \quad (17)$$

where $$r_{PW} = \frac{PW_{ratio}}{\mathrm{COT}} \quad (18)$$

$$s = \mathrm{slip} \quad (19)$$

f( )=nominal slip pull curve (from lookup table, see, e.g., FIG. 6)

As above in FIG. 8, a series of screens are applied to determine if the $r_{pw}$ value is retained. If any single screening criterion is not met, the value is discarded and a new value is generated at block 214.

At block 216, if no COT value is present, for example, if only an estimated initial condition of COT is in place, the value is discarded. At block 218, as above, no steering, braking, or significant implement movement commands may be active because potentially the power diverted to these functions could lead to an inaccurate drawbar pull value.

At block 220, ground speed must be available. If ground speed is not available, the estimator does not execute and the nominal initial value of the $k_{adj}$ estimate is used. If the ground speed signal is lost, the last known $k_{adj}$ is maintained until the signal returns. In an embodiment, an initial value for kadj may be used, such as 1.0.

At block 222, the track-type tractor 10 must be in a forward gear. At block 224, the track speed must be in a specified range. In an embodiment, the range is between 50 mm/s and 1500 mm/s. At block 226, track acceleration must be below a threshold level. In an embodiment, the track acceleration threshold may be around 50 mm/s$^2$. At block 228, slip should generally be below the knee of the pull-slip curve 152 although some overlap between slip percentages used in calculating COT may occur. In an embodiment, slip may be in a range of 0.5%-40% or in some embodiments a range of about 12% to 20%. An effect of this is to limit values of to $r_{pw}$ below the general range of the knee of the pull-slip curve 152.

At block 230, the value of $r_{pw}$ should be less than 0.99. That is, pull-weight ratios above the COT may be anomalous or are at least a special operational case and are discarded.

At block 232, a least squares estimate on the retained values may be performed to arrive at an estimated value of $k_{adj}$. In an embodiment, a minimum population size of 1500 samples is used. In another embodiment, at block 234, a minimum of three sets of $k_{adj}$ values are averaged to reduce sensitivity to anomalies in the cycle or to reduce the impact of varying ground conditions. An increase in the number of sets used for an average will cause slower adjustments to material variation, but provides more consistency in target speeds. A lower number of sets used in the average will allow the system to respond quicker to material variations.

Figure 12:
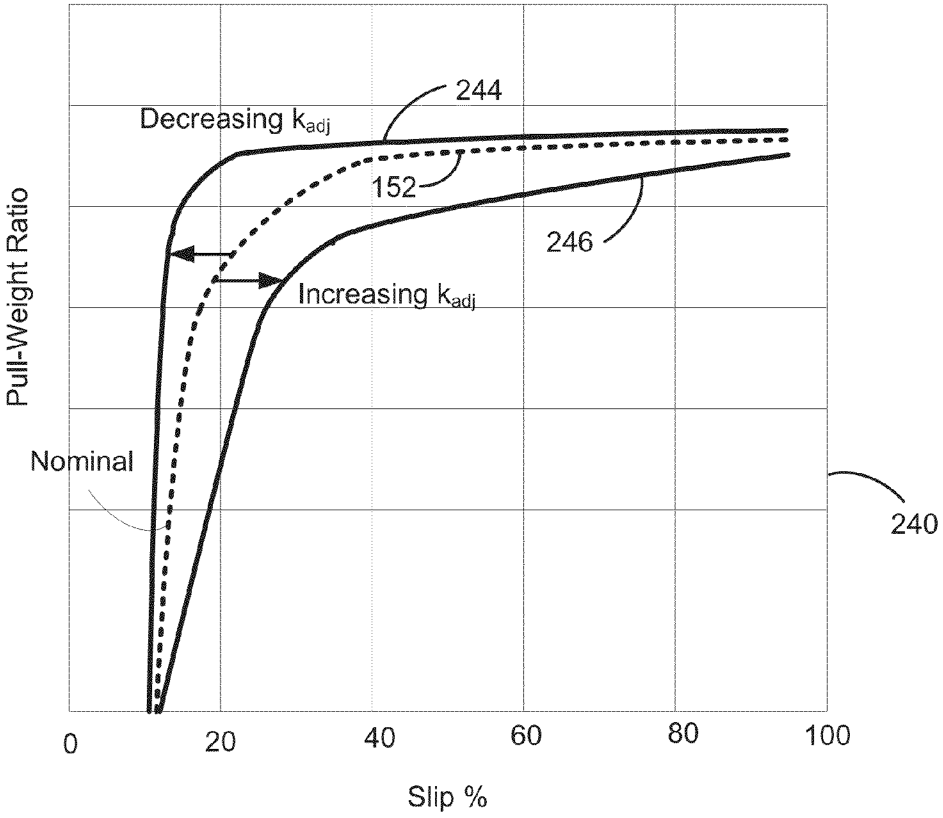
FIG. 12 illustrates a nominal pull slip curve adjusted for coefficient of traction and shear modulus adjustment factor.

Turning briefly to FIG. 12, a graph 240 illustrates the effect of $k_{adj}$ on the nominal pull-slip curve 152 of FIG. 6. Decreases in $k_{adj}$ move the nominal pull-slip curve 152 to the left, having a greater impact on the portion of curve 152 below the knee, indicating soil conditions that support higher pull-weight ratios for a given value of track slip. Conversely, increasing $k_{adj}$ move the nominal curve to the right, indicating soil conditions that support lower pull-weight ratios for a given value of track slip.

In an exemplary implementation for a given operating environment and operating state, values of kadj may range from about 0.1 to about 1.5. (again, these numbers depend on the nominal pull-slip curve 152).

After applying the COT and $k_{adj}$ factors to the nominal pull-slip curve 152, slip can be estimated as:

$$\mathrm{slip}_{Estimate} = f^{-1}(r_{PW})k_{adj} \quad (20)$$

That is, slip can be estimated for a given normalized pull weight ratio, $r_{pw}$, by using the nominal pull-slip curve 152 adjusted by $k_{adj}$. Additionally, ground speed can be estimated for the same normalized pull-weight ratio and a given track speed using the estimated slip value.

Optimum Performance Solver

In order to compare current performance to optimum performance, a theoretical optimum performance may be developed. Using the cycle power equation (5) above:

$$CyclePower = (DBP - RollRes - mg\sin\theta_{Pitch})v_{GndSpd}\frac{T_{Carry}}{T_{Cycle}} \quad (5)$$

In order to simplify the equation, Eq. 5 is restated in terms of a single variable, in this example, track speed.

$$CyclePower = (DBP - RollRes - mg\sin\theta_{Pitch})\, v_{GndSpd}\frac{1}{1 + \frac{v_{gnd}}{v_{rev}}\frac{d_{cycle}}{d_{carry}} + (T_{Load} + T_{spread})\frac{v_{gnd}}{d_{carry}}} \quad (21)$$

where, $$v_{gnd} = v_{trk}(1 - \mathrm{slip}/100) \quad (22)$$

$$\mathrm{slip} = f_{SlipPull}^{-1}(r_{PW})k_{adj} \quad (23)$$

-continued $$r_{PW} = \frac{DBP - RollRes}{\mathrm{COT} \cdot mg\cos\theta_{Pitch}} \quad (24)$$

$$DBP = f_{DBPcurve}^{-1}(v_{trk}) \quad (25)$$

As discussed above, $T_{spread}$ and $T_{Load}$ are estimated as constants and cycle distance is estimated during the reverse segments, see, e.g., Eq. 1. After making the additional substitutions above, the cycle power performance equation is completely expressed in terms of track speed and known constants, using the previously developed value for COT. The full equation with substitutions noted is illustrated in FIG. 22.

However, reducing the performance equation to a single variable also renders it unsolvable analytically. Therefore, an iterative process may be used to determine a peak value of the performance equation. One method of determining the peak value is discussed below with respect to FIG. 13. The performance equation is a theoretical operating point solver and applies whether or not ground speed is available. In an embodiment, slip and ground speed are always calculated as outlined in eqs. 22 and 23.

Cycle power is a useful metric for cyclic operations, such as the disclosed track-type tractor embodiments. However, these techniques for performance modeling are equally applicable to wheeled applications such as agricultural tractors. As these applications tend to be non-cyclic, that is, do not have defined forward and reverse portions, cycle power is not a particularly relevant metric for calculating performance. In non-cyclic applications, the cycle ratio $T_{carry}/T_{cycle}$ may be set to 1 so that the cycle power equation becomes a blade or implement power equation of the form:

$$\mathrm{ImplementPower} = (DBP - \mathrm{RollRes} - mg\sin\theta_{pitch})v_{GndSpd} \quad (26)$$

These applications include a track type tractor with a ripper, a track-type tractor using in a towing application, such as a towed scraper, agricultural tractors with towed implements such as a plow, wheel tractor scrapers, compactors, motorgraders, etc. In the case of wheeled machines, wheel speed is substituted for track speed in the above equation.

Figure 13:
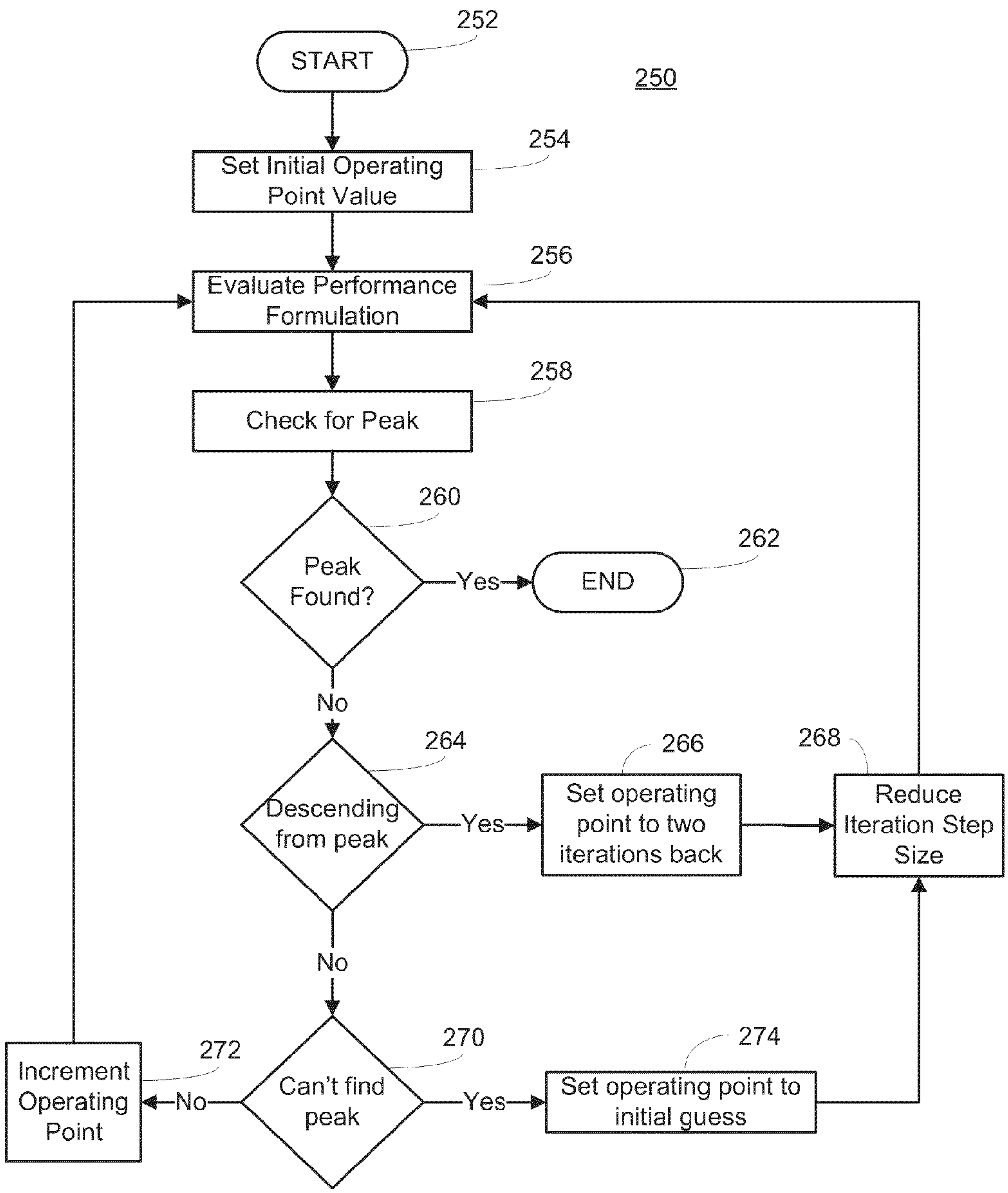
FIG. 13 is a flow chart illustrating determination of an optimum operating state.

FIG. 13 is a flow chart of a method 250 illustrating determination of an optimum operating state. The goal of this process is to determine the highest possible value of cycle power and the corresponding track speed by iteratively solving a performance equation over a range of track speeds, within a step-size limit of track speed values. If another performance measurement is used, the iterative process may be applied to a different input variable. After starting at block 252, an initial value for operating point is set at block 254. The initial value may be a predetermined default value or may be based on a previous value from, for example, a previous result from the same work area. For example, GPS position information may be associated with previous track speed/cycle power values for the same work area or a time-based recognition that a track-type tractor 10 is likely to be operating in the same area may point to using a recent value.

At block 256, the performance equation (Eq. 21) as substituted with equations 19-22 above is solved for a cycle power value. At block 258, a determination is made if a peak output value has been found. Various criteria may be applied to determine whether a peak has been found, but may include covering enough of the range of input values to identify a true peak and not just identify a local maxima, that the change in value of subsequent outputs is near zero, the output value is above a threshold, and/or that the iteration step size is below a threshold iteration step size. Practically, the shape of a performance curve 300, 304 may have a relatively flat top so that further reductions in iteration may not result in a significantly high peak performance value but conversely, may take much longer to calculate. At block 260, if the peak output value has been found, the 'yes' branch from block 260 is taken and the routine ends at block 262 and the optimum value is passed to block 128 of FIG. 4 for use as discussed above.

If the peak has not been found, the 'no' branch from block 260 may be taken to block 264. If, at block 264, the peak has not been found but the value is descending from the current high value, the 'yes' branch from block 264 may be taken to block 266 where the current value of optimum performance, in this example, the value of track speed, is set back two iterations and at block 268, the iteration step size is reduced. The process is then repeated beginning at block 256.

If at block 264, the current value is not descending from the peak, the 'no' branch from block 264 may be taken to block 270. At block 270, if a peak is not found, the 'no' branch from block 270 may be taken to block 272. At block 272, the current value of the input is incremented by the step size and the routine is continued at block 256. On the other hand, if at block 270 the peak finding routine has failed, the 'yes' branch may be followed to block 274.

At block 274, the routine may begin again with the initial value set as at block 254 and the iteration step size may be reduced at block 268 before the iteration process is restarted at block 256. When the process is complete, the optimum performance solver will have a solution that represents the optimum available performance of the track-type tractor 10 and the value of the input at which this value occurs. This value may be passed to block 128 of FIG. 4 where a normalized value of current performance is calculated:

$$NormPerf = \frac{\text{Measured Performance}}{\text{Peak Performance}} \times 100 \quad (27)$$

As discussed above, the optimum performance may be used by auto-loading or carrying functions at block 128 of FIG. 4. For example, if optimum performance is expressed in terms of track speed, the track speed target may be passed to the auto-loading or carrying function. In other embodiments, a target ground speed may be passed to the auto-loading or carrying function.

Figure 14:
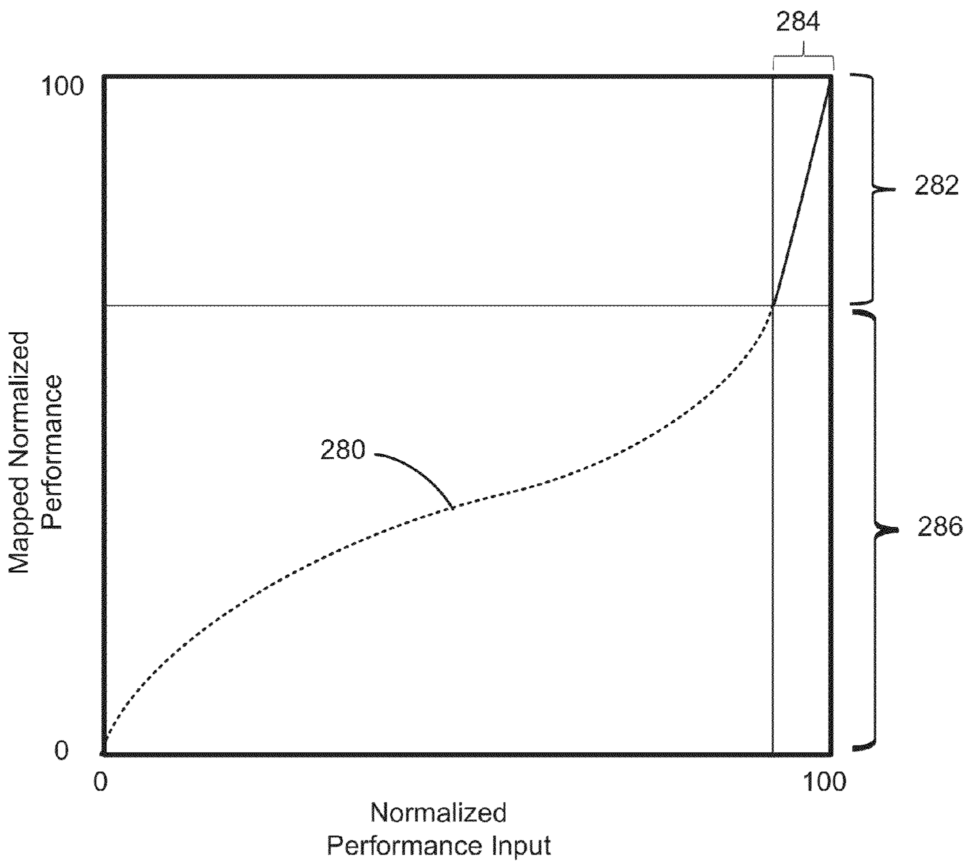
FIG. 14 is a graph showing a normalized performance curve.

Further, or instead, the normalized performance and the state at which it occurs may be passed to block 130 and conditioned for display to an operator. FIG. 14 illustrates an exemplary curve 280 illustrating performance mapping. Even though the normalized performance may range from 0% to 100%, the top portion of normalized performance 282 occurs over a disproportionally small range 284 of input values, e.g., track speed. The bottom portion of normalized performance 286 is relatively uninteresting because operation in this region is probably intentional operation for a purpose other than efficient work production.

The performance solver of eq. 21 and the process of FIG. 13 may be run whenever any of the input conditions changes beyond a pre-determined limit and may include, but are not limited to, change of forward gear, work cycle, slope, COT, or shear modulus (when available).

When ground speed is available, current actual performance can be explicitly calculated and used in displaying current vs. optimum performance, as described below with respect to FIGS. 21 and 22.

Figure 17:
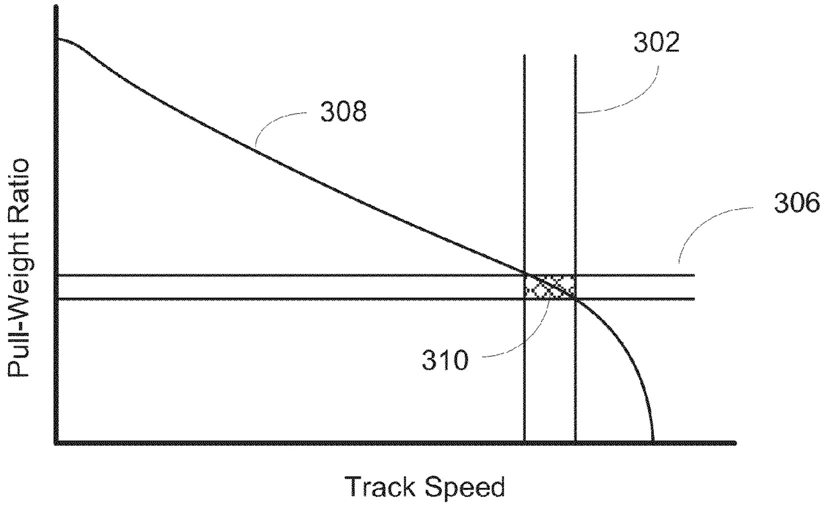
FIG. 17 shows an exemplary track speed vs. pull-weight operating range.
Figure 18:
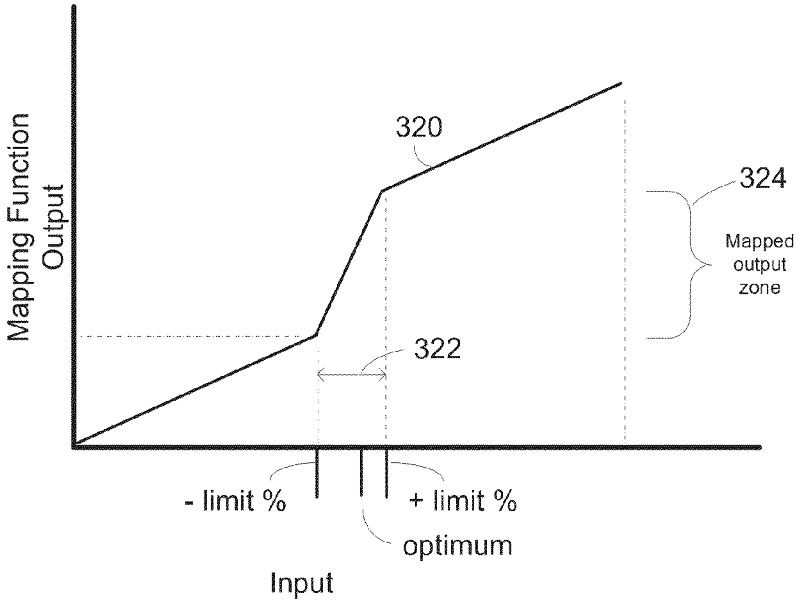
FIG. 18 illustrates target performance mapping.
Figure 19:
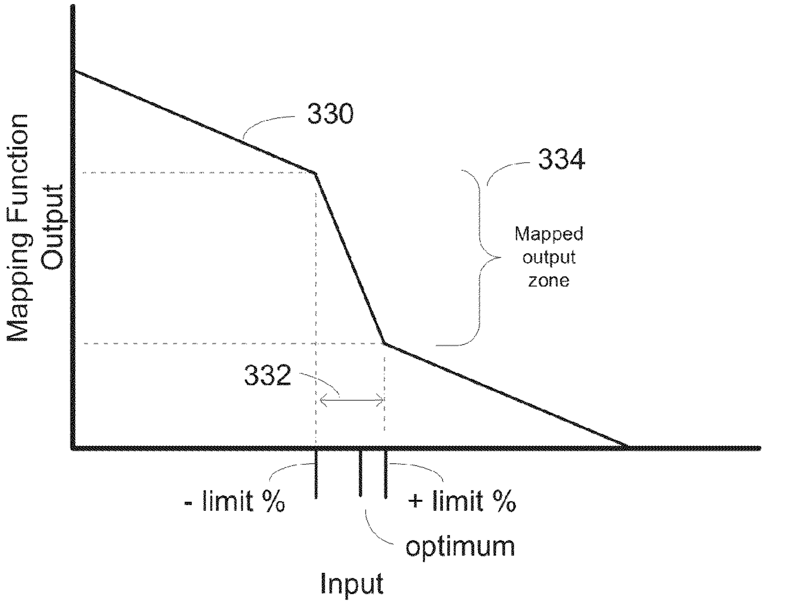
FIG. 19 illustrates an exemplary mapping transfer function.

FIGS. 17-19 illustrate performance estimating when ground speed is not available. When a ground speed sensor 40 is not available, cycle power, the numerator of the normalized performance in Eq. 26 cannot be calculated. Consequently, normalized performance may be calculated utilizing a combination of the ratios track speed to target track speed and pull-weight ratio to target pull-weight ratio. FIGS. 17-19 illustrate how normalized track speed and/or normalized DBP can be conditioned to create a display metric for an operator instead of normalized performance.

Figure 15:
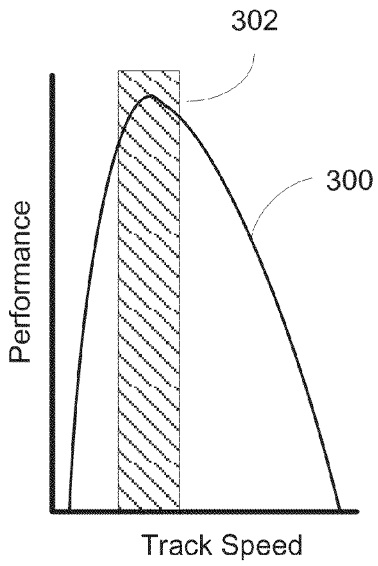
FIG. 15 shows an exemplary pull-weight ratio vs. performance operating range.

As discussed above, when ground speed is not known, the shear modulus adjustment factor cannot be calculated, however, both pull-weight ratio and track speed can be determined. FIG. 15 is a graph showing a track speed vs. performance curve 300 having a target range 302 of track speed centered around an optimum track speed target. The performance curve 300 may be calculated using the performance solver equation as described above. However, because ground speed is not known, simply knowing an optimum track speed for a given peak value of the performance curve 300 may not be enough information to assure that the tractor is truly operating at its optimum performance. For example, the tracks may be turning at the correct speed but the engine may be throttled back and not producing the expected work output. To address this, a second measurement may be taken for use in validating optimum performance.

Figure 16:
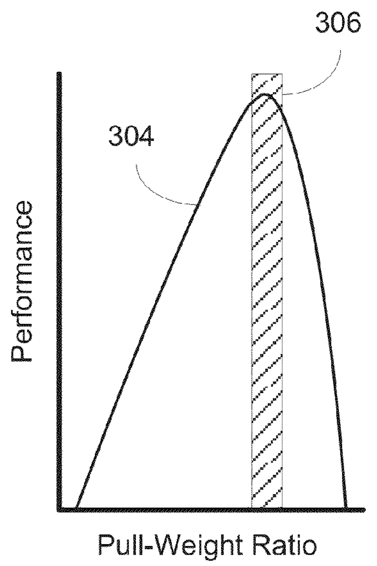
FIG. 16 shows an exemplary track speed vs. performance operating range.

Such a measurement is illustrated in FIG. 16 showing a pull-weight ratio vs. performance curve 304 with a target range 306 of pull-weight ratio centered around an optimum pull-weight ratio. The pull-weight ratio of the track-type tractor may be calculated without ground speed information. The known track speed to drawbar pull curve of FIG. 5 may be normalized to pull-weight ratio to account for variables such as slope and used to generate the performance to pull-weight ratio of FIG. 16. The optimum pull-weight ratio can then be calculated using the known track speed to drawbar pull curve and the optimum track speed target.

FIG. 17 shows a track speed vs. pull-weight ratio curve 308, similar in shape to the drawbar pull vs. track speed curve 142 of FIG. 5. Using the measured pull-weight ratio and the measured track speed, a current operating point can be found on the curve 308. The target range 302 for track speed and the target range 306 for pull-weight ratio overlap to create an optimum performance zone 310. The current performance is easily identified with respect to the optimum performance zone 310, and more particularly to an optimum performance point within the optimum performance zone 310 corresponding to the peak value of curves 300 and 304.

Note that either of the curves 300 and 304 may be computed by the optimum performance solver (eq. 21) whether or not current performance is known, that is, with or without ground speed measurements. In the exemplary embodiment, the solution is given in terms of track speed.

FIG. 18 illustrates target performance mapping for use in displaying performance to an operator. Normalized input, e.g. track speed over target track speed or pull-weight ratio over target pull-weight ratio, produces a normalized performance curve 320. A target range 322 is selected around an optimum value representing peak of the respective performance curve, e.g., pull-weight performance curve 304, between a low target limit and a high target limit. The limits are not necessarily symmetric around the optimum point because of the asymmetry of the performance curve. The curve 320 is particularly suited to pull-weight ratio input mapping.

The mapping function output (vertical axis) for a given input value represents the location of a current performance indicator for that input value, discussed more below. The mapped output zone 324 is displayed at an expanded scale compared to the full range of performance because the range of interest 322 is of the most relevance to the operator. The amount of "zoom" provided to the target range 322 is a function of the relative slopes of the segments of curve 320 and may be selected at design time, site set up, or during operation based on characteristics of the performance curve and individual preference.

FIG. 19, another exemplary mapping function curve 330 is illustrated. The mapping function curve 330 is similar to the performance curve 320 of FIG. 18 except that the slopes are inverted. In this embodiment, a target range 332 may correspond to a mapped zone 334. Because the performance curves, e.g., performance curves 300 and 304 of FIGS. 17 and 18, respectively, are asymmetric, the low target may be different than the high target. For example, a low target value may be the target value minus 10% and a high target value may be the target value plus 5%. The curve 330 may be particularly suited for use with track speed as the input because it is desired to indicate a large load when track speed is lower than the target. Therefore, the mapping curve 330 is inverted compared to the curve 320 of FIG. 18.

In comparison, the mapping curve 280 of FIG. 14, when groundspeed is available, displays a cursor at a center of a display at the 100% point and determines a direction above or below the center based on slip being higher or lower than the slip at the optimum performance point. Performance display is discussed in more detail below.

Reverse Performance

During the reverse segment, it is desired to travel at the top speed capable under the given conditions without causing damage or unnecessary long term wear on the machine. The optimum ground speed can be indicated to the operator in a similar manner to the optimum performance during the carry segment. A peak run-out reverse speed was calculated during the cycle portion of the peak performance solver. This speed can be used as a reverse speed target, then calculating a reverse performance metric as:

$$RevPerf = \frac{\text{Speed}}{\text{Target Speed}} \quad (28)$$

Figure 20:
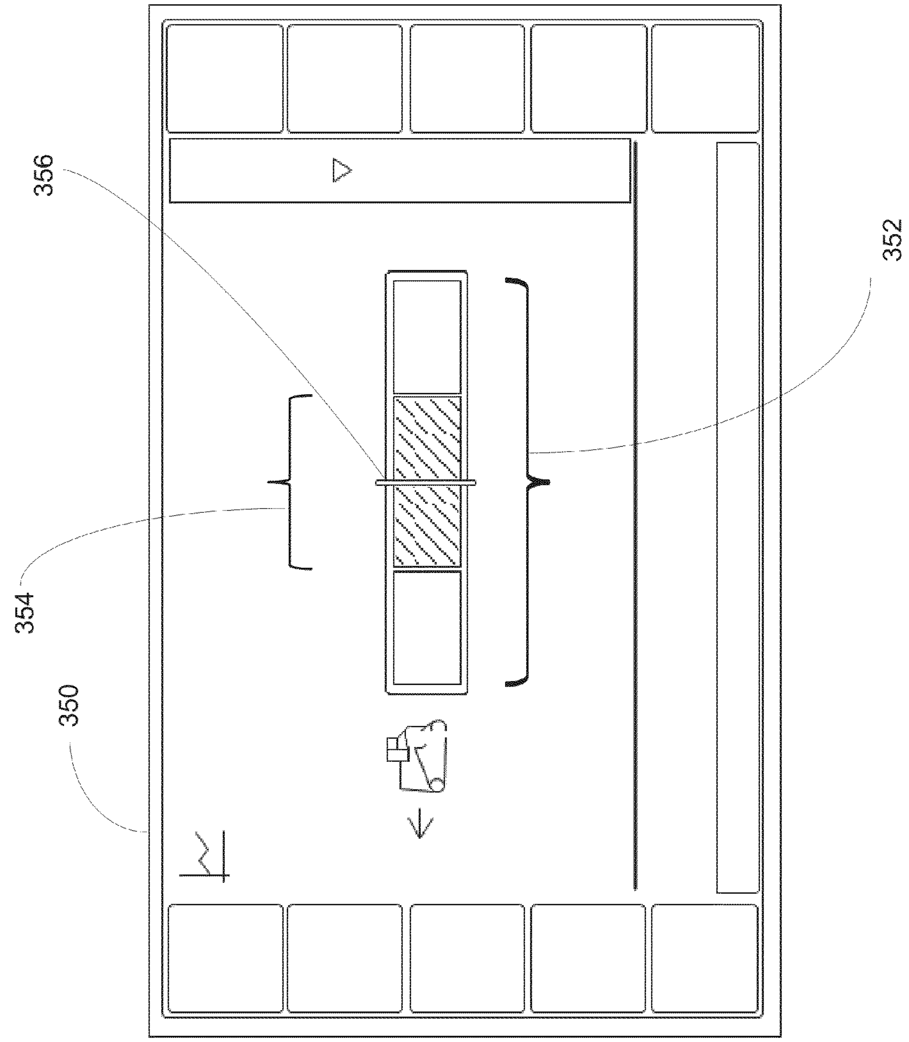
FIG. 20 is a screen shot illustrating an exemplary display of current and optimum operating states.

Mapping similar to that shown in FIG. 20 is applied to the desired operating range.

Displaying Target Performance

FIG. 20 is a screen shot 350 illustrating an exemplary display of current and optimum operating states in a window of the operator display device 54 of FIG. 2. The screen shot 350 shows, among other elements, a performance range 352 and an optimum range 354. The optimum range 354 may depict a range of optimum operating state corresponding to the range of interest 322 of FIG. 18, or similar depictions in FIGS. 16 and 19. A current performance indicator 356 shows where the current performance is with respect to the total performance range 352 and the optimum range 354. The displayed ranges and current performance are normalized and therefore are without units and because of the mathematical relationship between input state and performance, the display may reflect either current performance vs. optimum performance or a current input value vs. an optimum input value, such as track speed. An operator may use the current performance indicator 356 to determine that a change in operating state is required. The operator may choose to change the performance in one of several ways, including increasing or decreasing blade load, increasing or decreasing track speed, or a combination of both. In the illustrated embodiment, when the current performance indicator 356 is on the left side of the optimum range 354 or off the optimum range 354 to the left, it indicates the track-type tractor 10 is carrying too little load. If the current performance indicator 356 is on the right side of the optimum range 354 or off the optimum range 354 to the right, it indicates the track-type tractor 10 is carrying too much load. Other formats are possible, as long as the convention is understood.

In the normalized optimum range 354, the center of the display represents peak performance. Less than the peak performance is shown with the current performance indicator moving to the right or the left of center. In order to determine which direction to move the current performance indicator 356 or cursor, refer to exemplary performance curve 300 of FIG. 15. The performance curve 300 illustrates performance as a function of track speed. Similar curves for slip can be developed as well as others, such as the pull-weight curve 304 of FIG. 16. Each of these curves exhibits a peak at the highest point of the respective curves 300 and 304, which after normalization appears as the center point of the optimum range 354. The track speed (or other metric) associated with that peak performance can be used as the reference for polarity when displaying the current performance indicator 356. When the track speed is below the reference track speed, the current performance indicator 356 will be shown to the right of the center of the optimum range 354, indicating too much load. Conversely, when the track speed is greater than the reference track speed, the current performance indicator 356 will be shown to the left of the center of the optimum range 354, indicating not enough load.

When operating near the peak performance, because of the magnification effect of the optimum or target performance range on the display, slight changes in current performance may cause the current performance indicator 356 to jump back and forth around the optimum performance point and cause a distraction. This effect may be reduced by a debouncing function that adds hysteresis and/or data smoothing for successive inputs. The debouncing function may be applied to all values or only to values near the optimum performance point.

Figure 21:
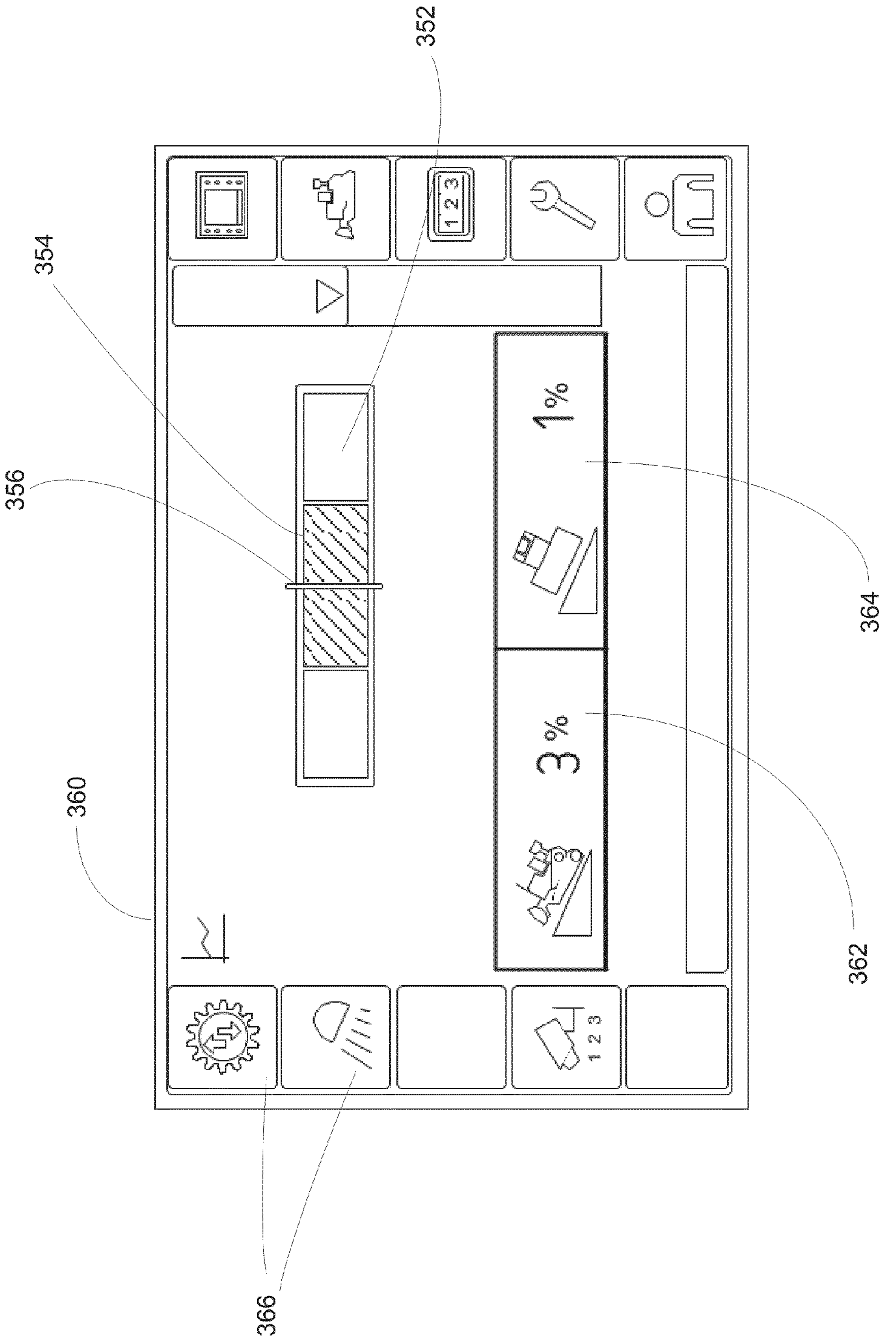
FIG. 21 is a screen shot illustrating another exemplary display of current and optimum operating states with slope indicators.

FIG. 21 is similar to FIG. 20 and illustrates a screen shot 360 having the performance range 352, optimum range 354 and current performance indicator 356. FIG. 21 also shows tractor slope both fore-and-aft 362 and side-to-side 364. Additional icons collectively represented by ref. no. 366 may be shown to allow access to other functions when activated or to indicate alarm conditions but simplicity of the screen is maintained. As shown in FIG. 20, the display is unitless, that is, absent any numerical values, while FIG. 21 shows only numerical values for slope. This greatly improves the conveyance of performance information "at a glance" because the operator does not have to analyze or process any figures or memorize pre-determined critical values associated with efficient operation.

When operating in reverse, the performance and associated ranges may be shown in terms of speed. During reverse, when the current performance indicator 356 is on the left, it may indicate a slower than ideal speed and to the right may indicate a faster than ideal speed. A faster than ideal speed may be caused by operating in a not recommended gear. The performance range 352 illustrated in FIG. 20 may be equally adapted to reverse speed, that is, too slow is shown to the left and too fast shown to the right of the center position.

Rubber tire/rubber track, non-cyclic applications.

Industrial Applicability

In general, providing an operator with tools to increase the efficient operation of a piece of equipment provides benefits of both lowered cost and improved performance to schedule. The simple display of current performance and optimum performance can ease operator transitions between different machine types as well as to reduce distractions, potentially leading to safer operation. The presentation of actual performance vs. an optimum performance based on current conditions is an improvement over prior art systems that indicate only current performance without respect to environment or display only standard pre-set working ranges. This system and method uses current local operating characteristics to develop an estimate of soil conditions, that is, a model of the current work surface. When the soil conditions are characterized, a standard operating model can be adjusted to account for changes in the operating environment and can be updated virtually in real time from worksite to worksite and from hour to hour.

Components of the soil model are used to adjust up-down and right-left a nominal pull-slip curve allowing simple calculations to determine an optimum performance in terms of a single variable, such as track speed. Once the optimum performance is determined, it can be used to normalize the current performance and present an operator with a single bar graph of performance. The bar graph may represent the full range of performance, an optimum range of performance, and a current performance in a single bar-style format allowing the operator to easily view and compare current and optimum performance. The operator can then decide what to do to achieve better performance, such as changing track speed by adjusting the throttle or by changing blade height to adjust load.

In the case of the reverse cycle, the same bar graph display may be used to indicate current reverse speed vs. an optimum reverse speed to maintain a consistent look and feel for the operator, simplifying training and carrying the same easy-to-comprehend display to the full work cycle.

Because the performance values are normalized during processing, the display of optimum performance and current performance can be carried out consistently across machine types and operating environments. Further, the ability to display this information without using any numerical values can reduce the training required as operators move between machines as well as to reduce the level of distraction in the cab during operation.

These techniques are described primarily with respect to track-type tractors, but as discussed above, the soil modeling, performance evaluation, and normalized performance display are equally applicable to wheeled machines as well as non-cyclic applications.

What is claimed is:

1. A track-type tractor adapted to characterize soil conditions during operation, the track-type tractor comprising:
- a slope sensor that provides a slope of the track-type tractor;
- a track speed sensor that provides a track speed of the track-type tractor;
- a processor coupled to the slope sensor and the track speed sensor; and
- a memory coupled to the processor, the memory storing a plurality of modules that when executed by the processor, cause the processor to:

access a nominal pull-slip curve stored in the memory;

store data received from the slope sensor and the track speed sensor;

collect a plurality of samples of drawbar pull over a period of time;

calculate an instantaneous pull-weight ratio as a function of drawbar pull, rolling resistance, and slope for each of the plurality of samples of drawbar pull to generate a plurality of pull-weight ratios;

calculate a coefficient of traction(COT) from the plurality of instantaneous pull-weight ratios;

divide values of the nominal pull-slip curve by the COT to produce a normalized pull-slip curve;

determine an optimum operating state defined as the highest possible value of cycle power of the track-type tractor using the calculated COT, the normalized pull-slip curve, and the slope; and provide the optimum operating state and a current operating point to a device for use in adjusting one or more operational settings of affecting the operating state of the track-type tractor.

2. The track-type tractor of claim 1, wherein the plurality of modules cause the processor to calculate the coefficient of traction by calculating the plurality of instantaneous pull-weight ratios ($PW_{ratio}$) as $$(\text{Drawbar Pull}-\text{Rolling Resistance})/(\text{machine mass}*\text{gravity}*\cos\theta_{pitch}).$$

3. The track-type tractor of claim 2, wherein the plurality of modules cause the processor to:

retain only instantaneous pull-weight ratios that meet all of:

data is taken while in a forward gear;

a track slip is greater than 20%;

no steering activity;

no brake activity;

deceleration pedal not activated; and each of the instantaneous pull-weight ratios must be in a range of a minimum of about 0.5 to a maximum of about 1.2.

4. The track-type tractor of claim 3, wherein the plurality of modules cause the processor to:

perform a validation test to determine that the plurality of instantaneous pull-weight ratios meet a data population criteria and a convergence criteria.

5. The track-type tractor of claim 4, wherein the plurality of modules cause the processor to:

offset the COT by a multiple of a standard deviation to account for a population bias at a low end of a slip range.

6. The track-type tractor of claim 1, wherein the plurality of modules further cause the processor to:

develop a shear modulus adjustment factor to characterize soil conditions from pull-weight ratios observed at a slip percentage in a second range that partially overlies the first range.

7. The track-type tractor of claim 6, wherein the second range is about 0.5% to about 40%.

8. The track-type tractor of claim 6, wherein the plurality of modules cause the processor to:

calculate the shear modulus adjustment factor using a plurality of normalized pull-weight ratios ($r_{pw}$) as $$r_{pw} = \frac{PW_{ratio}}{COT}$$

and to retain from the plurality only those values that meet additional criteria including at least one of:

data is taken while in a forward gear;

the track speed is in a range of a minimum of about 50 mm/s to a maximum of about 1500 mm/s;

track acceleration is less than approximately 50 mm/s$^2$;

$r_{pw}$ is less than approximately 0.99;

a COT value must have been successfully developed;

ground speed must be available;

no steering activity;

no brake activity;

deceleration pedal not activated.

9. A method of characterizing soil conditions during operation of a track-type tractor, the method comprising:

providing a nominal pull-slip curve corresponding to a standard soil condition;

receiving, at a processor, data from at least one sensor of the track-type tractor, the data corresponding to a slope of the track-type tractor and one or more of a track speed, a ground speed, and a drawbar pull;

producing, at the processor, a coefficient of traction (COT), wherein producing the COT includes:

calculating a plurality of instantaneous pull-weight ratio values using the drawbar pull and the slope;

removing instantaneous pull-weight ratio values from the plurality of instantaneous pull-weight ratio values that fail to meet a first screening criteria; and averaging the instantaneous pull-weight ratio values that meet the first screening criteria to produce the COT;

normalizing, at the processor, the nominal pull-slip curve by the COT to produce a normalized pull-slip curve;

producing, at the processor, a shear modulus adjustment factor that characterizes soil conditions, wherein producing the shear modulus adjustment factor includes:

calculating a plurality of normalized pull-weight ratio values;

removing normalized pull-weight ratio values that fail to meet a second screening criteria;

calculating the shear modulus adjustment factor from the normalized pull-weight ratio values meeting the second screening criteria;

applying the shear modulus adjustment factor to the normalized pull-slip curve to obtain an adjusted pull-slip curve; and using the adjusted pull-slip curve, the COT, and the slope to determine an optimum performance; and providing the optimum performance to a device for use in adjusting a current operating state of the track-type tractor to reach the optimum performance.

10. The method of claim 9, further comprising performing a validation test on each of the plurality of instantaneous pull-weight ratio values that meet the first screening criteria to determine that the plurality of instantaneous pull-weight ratio values meet a data population criteria and a convergence criteria.

11. The method of claim 9, wherein removing instantaneous pull-weight ratio values that fail to meet the first screening criteria comprises removing the instantaneous pull-weight ratio values that fail any of:

data is taken while in a forward gear;

a track slip is greater than 20%;

no steering activity;

no brake activity;

deceleration pedal not activated;

must be in a range of a minimum of about 0.5 to a maximum of about 1.2.

12. The method of claim 11, further comprising offsetting the COT by a multiple of a standard deviation to account for a population bias at a low end of a range of track slip.

13. The method of claim 9, wherein normalizing the nominal pull-slip curve by the COT comprises dividing each point on the nominal pull-slip curve by the COT.

14. The method of claim 9, wherein calculating each of the plurality of normalized pull-weight ratio values ($r_{pw}$) comprises calculating $$r_{pw} = \frac{PW_{ratio}}{\text{COT}}.$$

15. The method of claim 9, wherein removing normalized pull-weight ratio ($r_{pw}$) values that fail to meet the second screening criteria comprises removing the normalized pull weight ratio values that fail any of:

data is taken while in a forward gear;

track acceleration is less than approximately 50 mm/$s^2$;

track slip is in a track slip range of a minimum of about 0.5% to a maximum of about 40%;

a COT value must have been successfully developed;

the ground speed must be available;

no steering activity;

no brake activity;

deceleration pedal not activated.

16. The method of claim 15, wherein calculating the shear modulus adjustment factor ($k_{adj}$) comprises fitting an estimated slip (s') to a measured slip (s) based on the inverse function of the normalized pull-slip curve over the normalized pull-weight ratio values meeting the second screening criteria using a data fitting technique.

17. The method of claim 16, wherein determining the estimated slip of the tracks at any normalized pull weight ratio ($r_{pw}$) comprises performing a calculation of $(f^{-1}(r_{pw}))*k_{adj}$), where $f^{-1}$ is the inverse function of the normalized pull-slip curve.

18. A method of characterizing soil conditions during operation of a track-type tractor implemented by execution of computer-executable instructions stored on a computer readable memory storing computer-executable instructions, the method comprising:

providing a nominal pull-slip curve corresponding to a standard soil condition;

receiving, at a processor, data from at least one sensor of the track-type tractor, the data corresponding to a slope of the track-type tractor and one or more of a track velocity, a ground speed, and a drawbar pull;

producing, at the processor, a coefficient of traction (COT), wherein producing the COT includes:

calculating a plurality of instantaneous pull-weight ratios using the drawbar pull and the slope;

removing from the plurality of instantaneous pull-weight ratios the instantaneous pull-weight ratios that fail to meet a first screening criteria, the first screening criteria including removing the instantaneous pull-weight ratios corresponding to a slip value less than 20%; and averaging the instantaneous pull-weight ratios that meet the first screening criteria to produce the COT;

normalizing, at the processor, the nominal pull-slip curve by the COT to produce a normalized pull-slip curve;

producing, at the processor, a shear modulus adjustment factor, wherein producing the shear modulus adjustment factor includes:

calculating a plurality of normalized pull-weight ratio values;

removing normalized pull-weight ratio values that fail to meet a second screening criteria, the second screening criteria including removing the normalized pull-weight ratio values corresponding to a slip outside a range of about 0.5% to about 40%;

calculating the shear modulus adjustment factor from the normalized pull-weight ratio values meeting the second screening criteria;

applying the shear modulus adjustment factor to the normalized pull-slip curve to obtain an adjusted pull-slip curve; and using the adjusted pull-slip curve, the COT, and the slope to determine an optimum performance; and providing the optimum performance to a device for use in adjusting an operating state of the track-type tractor to achieve a performance closer to the optimum performance.

19. The method of claim 18, further comprising:

collecting a minimum of about 300 pull-weight ratio values that meet the first screening criteria to produce the COT;

collecting a minimum of about 800 of the normalized pull-weight ratio values that meet the second screening criteria to produce the shear modulus adjustment factor.

20. The method of claim 19, further comprising:

collecting additional normalized pull-weight ratio values;

producing two additional shear modulus adjustment factors; and averaging the three shear modulus adjustment factors to produce a final shear modulus adjustment factor used in further calculations.

* * * * *